United States Patent
Yu

(10) Patent No.: US 9,417,608 B2
(45) Date of Patent: Aug. 16, 2016

(54) APPARATUS AND METHOD FOR GENERATING INTERFERENCE FRINGE PATTERN

(71) Applicant: CANON KABUSHIKI KAISHA, Tokyo (JP)

(72) Inventor: Chung-Chieh Yu, Tucson, AZ (US)

(73) Assignee: Canon Kabushiki Kaisha, Tokyo (JP)

( * ) Notice: Subject to any disclaimer, the term of this patent is extended or adjusted under 35 U.S.C. 154(b) by 213 days.

(21) Appl. No.: 14/098,942

(22) Filed: Dec. 6, 2013

(65) Prior Publication Data

US 2014/0267597 A1  Sep. 18, 2014

Related U.S. Application Data

(60) Provisional application No. 61/794,265, filed on Mar. 15, 2013.

(51) Int. Cl.
*H04N 5/89* (2006.01)
*G03H 1/04* (2006.01)
*G03H 1/26* (2006.01)

(52) U.S. Cl.
CPC ............ *G03H 1/0443* (2013.01); *G03H 1/265* (2013.01); *G03H 2001/0445* (2013.01); *G03H 2001/0463* (2013.01); *G03H 2001/0471* (2013.01); *G03H 2222/34* (2013.01)

(58) Field of Classification Search
CPC ............... G03H 1/0443; G03H 2001/0463; G03H 1/265; G03H 2222/34; G03H 2001/0471; G03H 2001/0445
USPC ............................................. 348/40; 359/10
See application file for complete search history.

(56) References Cited

U.S. PATENT DOCUMENTS

| 5,650,855 A * | 7/1997 | Kirsch ................... G01B 9/021 356/392 |
| 5,684,592 A * | 11/1997 | Mitchell .................. G01H 9/00 356/493 |
| 6,512,735 B1 * | 1/2003 | Takeda ................... G11B 7/007 369/275.3 |

(Continued)

OTHER PUBLICATIONS

Alejandro Calabuig, Vicente Micó, Javier Garcia, Zeev Zalevsky, Carlos Ferreira, Single-Exposure Super-Resolved Interferometric Microscopy by Red-Green-Blue Multiplexing, Optics Letters, Mar. 15, 2011, 36(6):885-887, Optical Society of America, Washington DC, 2011.

(Continued)

*Primary Examiner* — William Tran
(74) *Attorney, Agent, or Firm* — Canon U.S.A., Inc. IP Division

(57) ABSTRACT

An apparatus for generating holograms includes a laser source configured to emit a laser beam with a frequency of v; an acoustic optical modulator configured to generate, from the laser beam, a first beam with a frequency of $v_1$ and a second beam with a frequency of $v_2$; a first beam splitter configured to split the first beam into a first reference beam and a first object beam, the first object beam being led to a sample; a second beam splitter configured to split the second beam into a second reference beam and a second object beam, the second object beam being led to the sample; and a detector configured to detect an image composed of a first fringe, based on the first reference beam and the first object beam, and a second fringe, based on the second reference beam and the second object beam.

9 Claims, 34 Drawing Sheets

(56) References Cited

U.S. PATENT DOCUMENTS

| | | | |
|---|---|---|---|
| 2002/0163680 A1* | 11/2002 | Zabka | G03H 1/10 359/10 |
| 2006/0262316 A1* | 11/2006 | Baney | G01J 3/45 356/451 |
| 2009/0125242 A1* | 5/2009 | Choi | G01N 21/45 702/19 |
| 2013/0222786 A1* | 8/2013 | Hanson | G01P 5/26 356/28 |
| 2013/0286403 A1 | 10/2013 | Matsubara et al. | |

OTHER PUBLICATIONS

Wei Jia, Zhongyu Chen, Fung Jacky Wen, Changhe Zhou, Yuk Tak Chow, and Po Sheun Chung, Single-Beam Data Encoding Using a Holographic Angular Multiplexing Technique, Applied Optics, Dec. 1, 2011, 50(34):H30-H35, Optical Society of America, Washington DC, 2011.

Jonas Kühn, Tristan Colomb, Frédéric Montfort, Florian Charrière, Yves Emery, Etienne Cuche, Pierre Marquet, Christian Depeursinge, Real-Time Dual-Wavelength Digital Holographic Microscopy with a Single Hologram Acquisition, Optics Express, Jun. 11, 2007, 15(12):7231-7242, Optical Society of America, Washington DC, 2007.

Jonas Kühn, Tristan Colomb, Frédéric Montfort, Florian Charrière, Christian Depeursinge, Real-Time Dual-Wavelength Digital Holographic Microscopy with a Single Hologram, SPIE Europe, Optical Metrology, Optical Measurement Systems for Industrial Inspection V, Munich, DE, Jun. 18-22, 2007, Proceedings of the SPIE, 2007, vol. 6616, article 661615, pp. 661615-1-661615-9, Society of Photo-Optical Instrumentation Engineers, Bellingham, WA, 2007.

J. Kühn, F. Charrière, T. Colomb, E. Cuche, F. Montfort, Y. Emery, P. Marquet, C Depeursinge, Axial Sub-Nanometer Accuracy in Digital Holographic Microscopy, Measurement Science and Technology, Jul. 2008, vol. 19, No. 7, article 074007, pp. 1-8, IOP Publishing Ltd. Bristol, UK, 2008.

Christopher J. Mann, Philip R. Bingham, Henry K. Lin, Vincent C. Paquit, Shaun S. Gleason, Dual Modality Live Cell Imaging with Multiple-Wavelength Digital Holography and Epi-Fluorescence, 3D Research Express, Nov. 2011, vol. 2, No. 1, article 5, pp. 1-6, Springer, Berlin, DE, 2011.

M. Paturzo, P. Memmolo, A. Tulino, A. Finizio, P. Ferraro, Investigation of Angular Multiplexing and De-Multiplexing of Digital Holograms Recorded in Microscope Configuration, Optics Express, May 25, 2009, 17(11):8710-8718, Optical Society of America, Washington DC, 2009.

Tatsuki Tahara, Akifumi Maeda, Yasuhiro Awatsuji, Takashi Kakue, Peng Xia, Kenzo Nishio, Shogo Ura, Toshihiro Kubota, Osamu Matoba, Single-Shot Dual-Illumination Phase Unwrapping Using a Single Wavelength, Optics Letters, Oct. 1, 2012, 37(19):4002-4004, Optical Society of America, Washington DC, 2012.

* cited by examiner $t = 0$ $t = 1\text{ns}$ $t = 2.5\text{ns}$ time averaged $t = 0$ $t = 1\text{ns}$ $t = 2.5\text{ns}$ time averaged

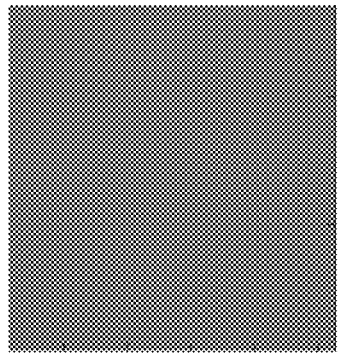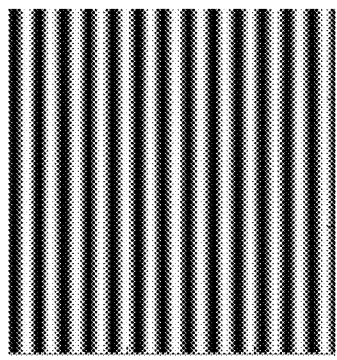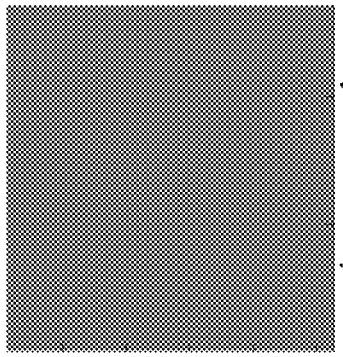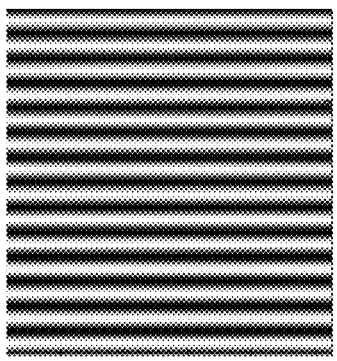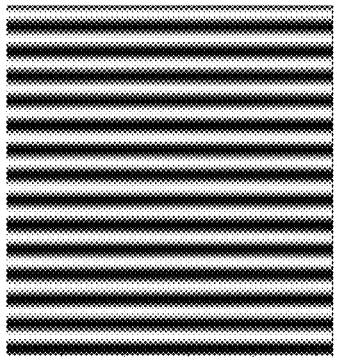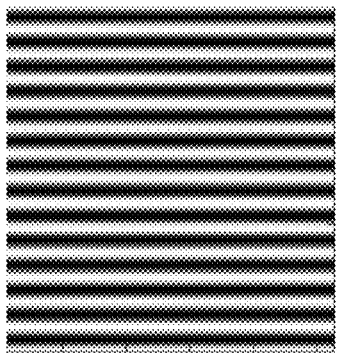
FIG. 9A  $t=0$
FIG. 9B  $t=1\text{ns}$
FIG. 9C  $t=2.5\text{ns}$
FIG. 9D  time averaged
FIG. 10A  $t=0$
FIG. 10B  $t=1\text{ns}$
FIG. 10C  $t=2.5\text{ns}$
FIG. 10D  time averaged

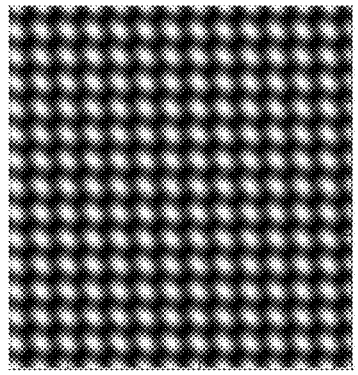
FIG. 11A  $t = 0$
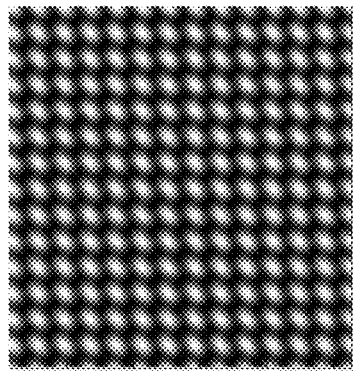
FIG. 11B  $t = 1\text{ns}$
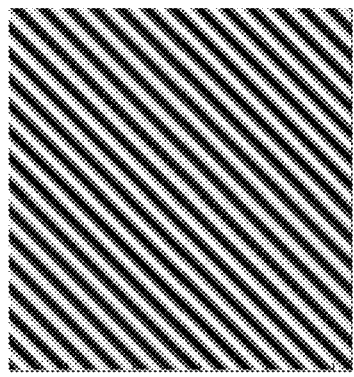
FIG. 11C  $t = 2.5\text{ns}$
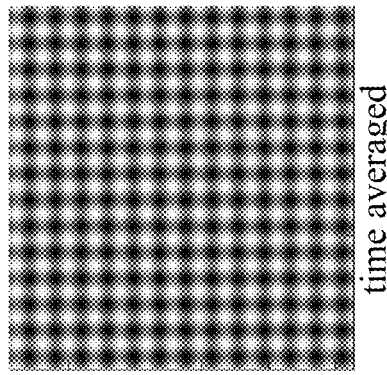
FIG. 11D  time averaged

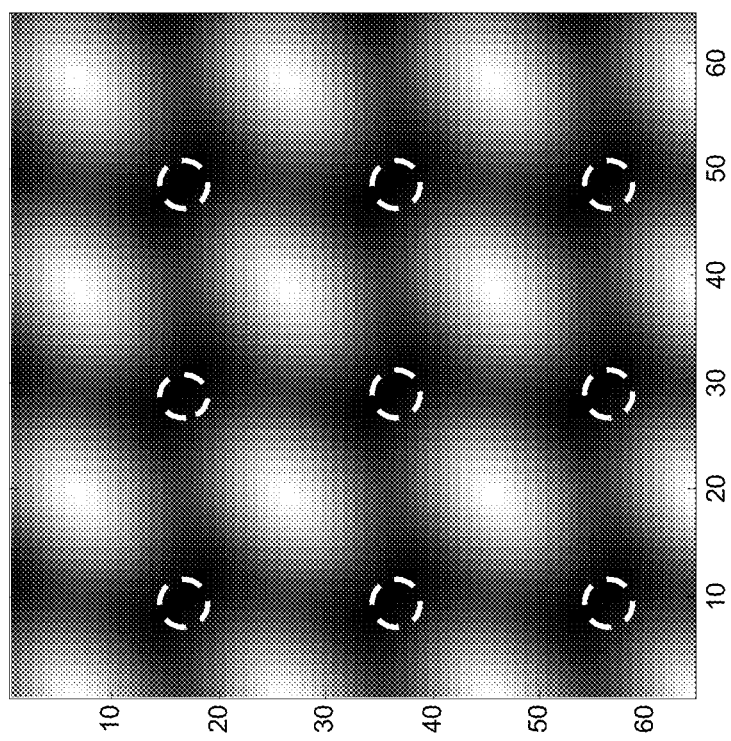

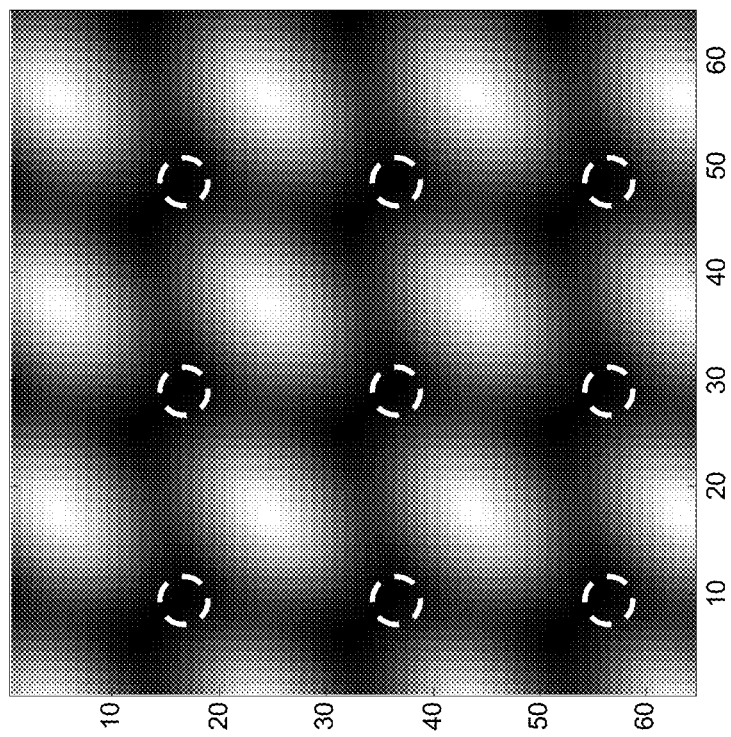

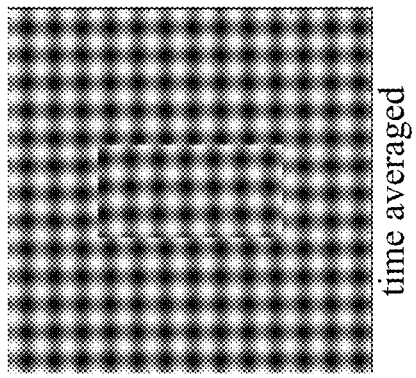
FIG. 14D time averaged
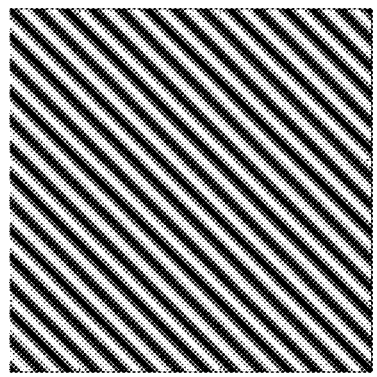
FIG. 14C t = 2.5ns
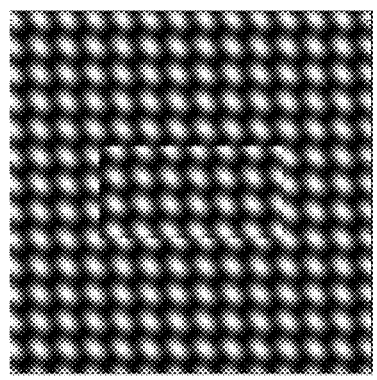
FIG. 14B t = 1ns
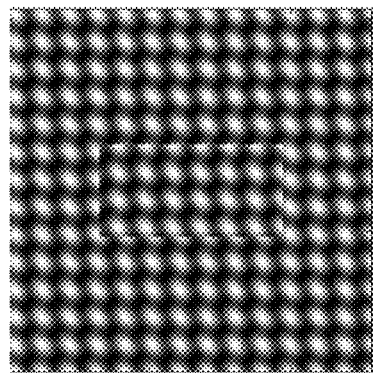
FIG. 14A t = 0

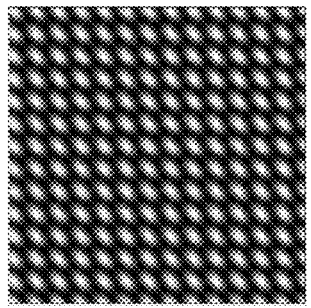
Image with time-dependent terms
FIG. 16A
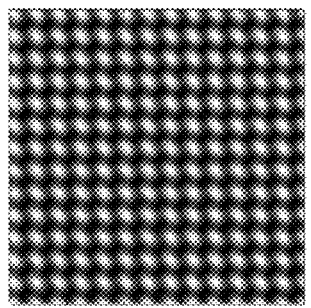
Final image with all terms
FIG. 16B
Image with time-dependent terms
FIG. 17A
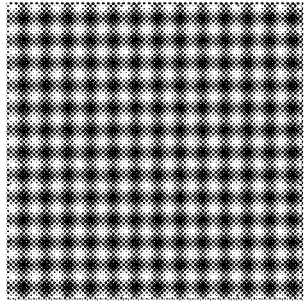
Final image with all terms
FIG. 17B

APPARATUS AND METHOD FOR GENERATING INTERFERENCE FRINGE PATTERN

CROSS REFERENCE TO RELATED APPLICATIONS

This application claims priority to U.S. provisional application No. 61/794,265 filed Mar. 15, 2013 entitled "APPARATUS AND METHOD FOR GENERATING HOLOGRAMS," the entire contents of which are hereby incorporated by reference.

BACKGROUND

1. Field of the Disclosure

Aspects of the disclosure generally are related to an apparatus and a method for generating an interference fringe pattern. More specifically, the disclosure is related to a holographic microscope.

2. Description of the Related Art

For real-time dual-wavelength imaging, Kühn et al. disclosed a technique to perform two-wavelength digital holographic microscopy measurements with a single hologram acquisition (Jonas Kühn, Tristan Colomb, Frédéric Montfort, Florian Charrière, Yves Emery, Etienne Cuche, Pierre Marquet, and Christian Depeursinge, Optics Express, Vol. 15, No. 12, pp. 7231-7242 (2007)).

Since two semiconductor laser diodes at $\lambda 1 = 679.57$ nm and $\lambda 2 = 759.91$ nm are used for obtaining a two-wavelength hologram, the spatial frequencies of each wavelength in the Fourier spectrum of the hologram is filtered (selected) separately.

The reason why Kühn et al. uses two laser sources to obtain the two-wavelength hologram is that they can create a synthetic beat wavelength which is much longer than either of the laser wavelengths. The range of the measurable sample depth is limited by the light wavelength used. Therefore, using the synthetic beat wavelength may increase the range of the sample depth measured.

SUMMARY

Embodiments of the present disclosure provide an apparatus and a method for generating holograms.

According to an aspect of the present embodiment, it is provided that an apparatus for generating holograms comprising: a laser source configured to emit a laser beam with a frequency of v; an acoustic optical modulator configured to generate, from the laser beam, a first beam with a frequency of $v_1$ and a second beam with a frequency of $v_2$ different from the frequency of $v_1$; a first beam splitter configured to split the first beam into a first reference beam and a first object beam, the first object beam being led to a sample with a first incident angle; a second beam splitter configured to split the second beam into a second reference beam and a second object beam, the second object beam being led to the sample with a second incident angle; and a detector configured to detect, at an exposure time, an image composed of a first interference fringe pattern, based on the first reference beam and the first object beam, and a second interference fringe pattern, based on the second reference beam and the second object beam, wherein the inverse of $\Delta v$ ($\Delta v = |v_2 - v_1|$) is shorter than the exposure time so that the detector does not detect interference fringe patterns due to a first pair of the first and second reference beams, a second pair of the first and second object beams, a third pair of the first reference beam and the second object beam, and a fourth pair of the second reference beam and the first object beam.

Further features of the present invention will become apparent from the following description of exemplary embodiments with reference to the attached drawings.

BRIEF DESCRIPTION OF THE DRAWINGS

FIGS. 9A to 9D are calculated images based on interference between reference beam 1 and object beam 2.

FIGS. 10A to 10D are calculated images based on interference between reference beam 2 and object beam 1.

FIGS. 11A to 11D are calculated images based on interference between four all beams.

FIGS. 14A to 14D are simulation results showing time dependent images.

FIGS. 16A and 16B are images with time-dependent terms and a final image with all terms, respectively.

FIGS. 17A and 17B are images with time-dependent terms and a final image with all terms, respectively.

DESCRIPTION OF THE EMBODIMENTS

Embodiments according to the present invention will be described below with reference to the attached drawings.

As for holographic microscopy, reducing acquisition time for holograms is desired, especially for the three-dimensional imaging. Therefore, the present embodiment explains a new method and apparatus with multi-angle illumination on the object.

Figure 1:
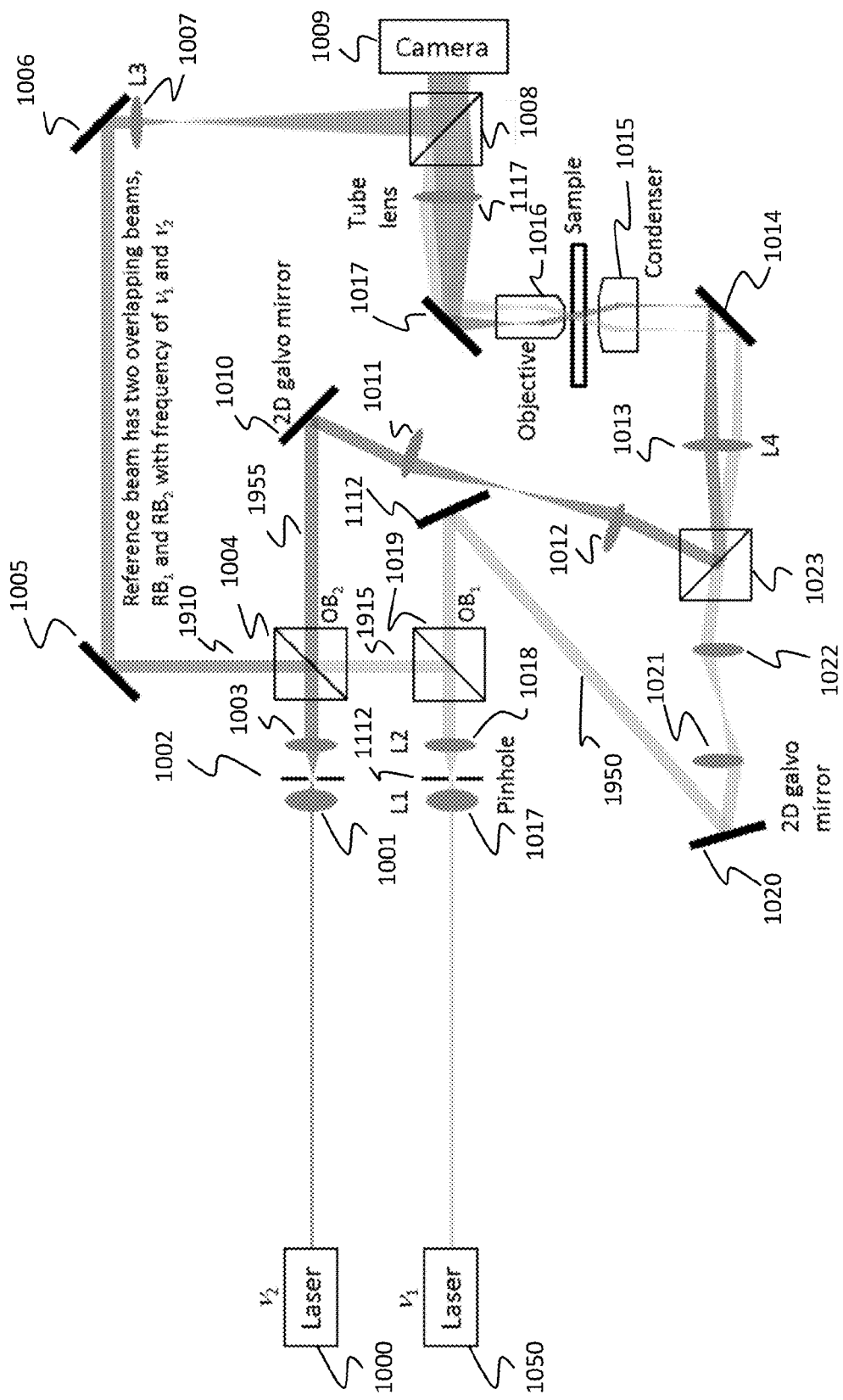
FIG. 1 illustrates an apparatus for generating holograms.

FIG. 1 illustrates an apparatus for generating composite multiplex holograms using two independent lasers (1000 and 1050). The laser beam with the light frequency $v_1$ is expanded and spatially filtered by two lenses L1 (1017), L2 (1018) and a pinhole (1112).

The laser beam from the laser 1050 is split into a reference beam (RBJ 1915 and an object beam (OBJ 1950 by a beam splitter/coupler 1019. The reference beam, $RB_1$, is focused by a lens (L3) 1007 and diverging to the camera 1009 via beam splitters/couplers (1004, 1008), mirrors 1005, 1006. The object beam, $OB_1$, is angle-controlled by the 2D galvo mirror 1020 and going through a microscope, which consists of a condenser and objective lens (1015 and 1016), and the sample via beam splitters/couplers (1019, 1023), the mirrors (1112, 1020, 1014), and lenses (1021, 1022, 1013). The object beam is led to the camera via a mirror 1017 and a tube lens 1117. The reference beam, $RB_1$ (1915), and the object beam, $OB_1$ (1950), are combined on the camera, having a detector, with an angle between them. The wavefront curvatures of $RB_1$ and $OB_1$ are matched so that one set of parallel fringes due to two beams interference is formed on the camera 1009 when there is no sample in the object beam, $OB_1$, path. Once a sample is placed in the object beam $OB_1$, that sample changes the light phase such that the wavefront of the object beam, $OB_1$, is modulated. This causes the parallel fringes to be modulated. The modulation of the fringes is used to extract the refractive index property of the sample integrated along the direction of the object beam, $OB_1$.

Another laser beam with the light frequency $v_2$ is expanded and spatially filtered by two lenses (1001, 1003) and a pinhole 1002. The laser beam is split into a reference beam ($RB_2$, 1910) and an object beam ($OB_2$, 1955). The two reference beams are overlapped through the beam splitter 1004. The reference beam, $RB_2$, is focused by a lens 1007 (L3) and diverging to the camera 1009. The object beam, $OB_2$, 1955, is angle controlled by the 2D galvo mirror 1010 and going through lenses 1011 and 1012, a microscope, which consists of a condenser and objective lens (1015, 1016), and the sample. The reference beam, $RB_2$, and the object beam, $OB_2$, are combined on the camera 1009 with an angle between them. The wavefront curvatures of $RB_2$ and $OB_2$ are matched so that one set of parallel fringes due to two beams interference is formed on the camera when there is no sample in the object beam, $OB_2$, path. Once a sample is placed in the object beam, $OB_2$, that sample changes the light phase such that the wavefront of the object beam, $OB_2$, is modulated. This causes the parallel fringes to be modulated. The modulation of the fringes is used to extract the refractive index property of the sample integrated along the direction of the object beam, $OB_2$.

The orientation of the first set of fringes, generated by the interferences between $RB_1$ and $OB_1$ should be different from that of the second set of fringes, generated by the interferences between $RB_2$ and $OB_2$ to create the separation between two corresponding images in the Fourier space.

Furthermore, two lasers (1000, 1050) are independent and the beams coming from two lasers do not interfere and give other sets of interference fringes. It is important to have two beams not interfere with each other. Using two independent lasers is one way of realizing this condition.

Instead of using two laser sources to obtain a two-wavelength hologram, an apparatus and a method using one laser source will be explained below.

It is desirable for our disclosure to use single laser source for simplicity instead of two sources. Nevertheless, one drawback is that we will have a "cross-talk" spectrum in the Fourier space due to the interference between two object beams. However, it is discovered that there is substantially no cross-talk when two light beams have difference light frequencies. This embodiment describes the method to generate two light beams using a single light source (laser) to avoid the cross-talk. Even though these two beams will interfere, the time average of the interference becomes spatially uniform. Thus, no "cross-talk" spectrum will show up in the Fourier space.

Embodiment 1

Figure 2A:
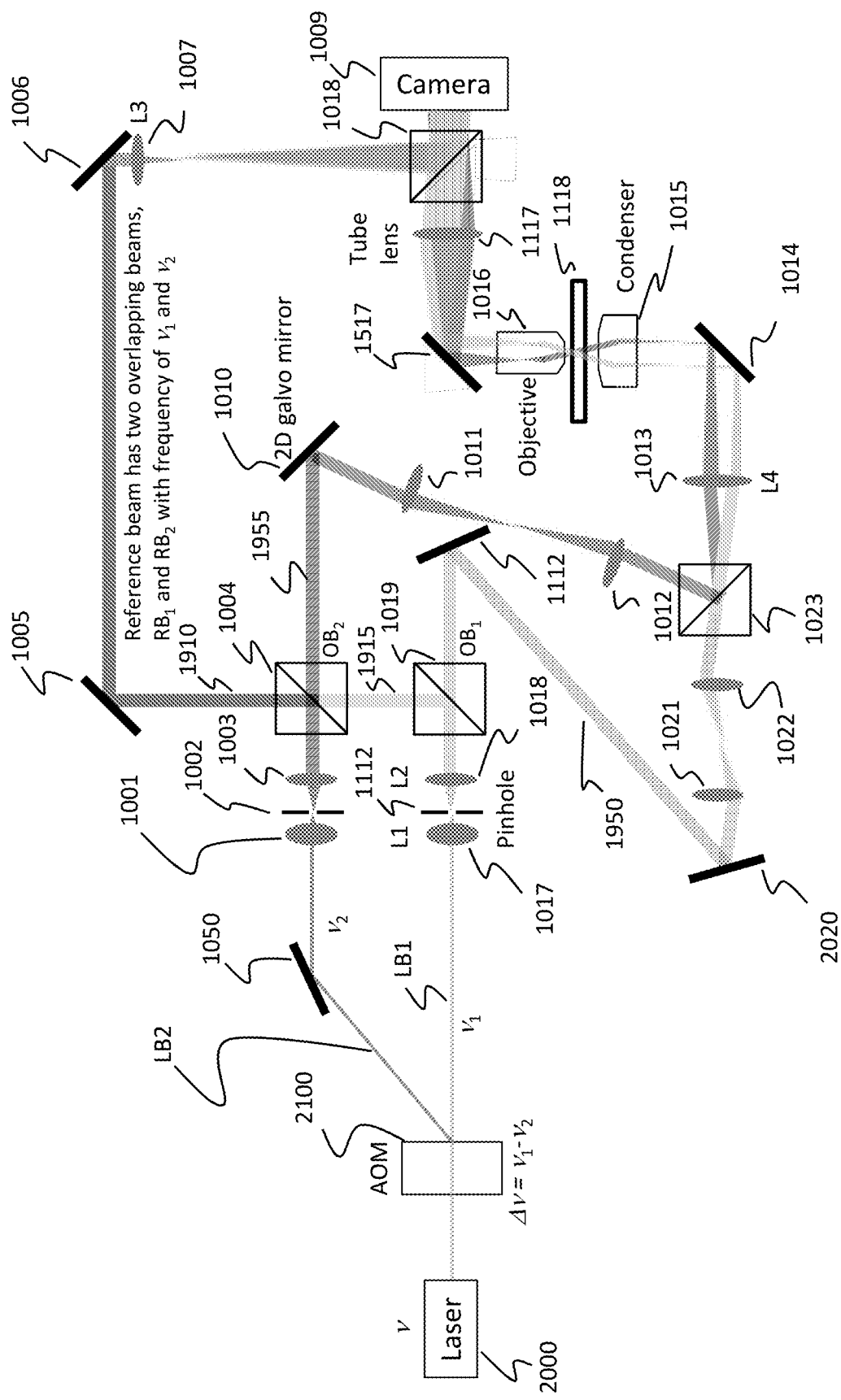
FIGS. 2A and 2B illustrate an apparatus for generating holograms explained in an embodiment 1.

An apparatus for generating composite multiplex holograms is illustrated in FIG. 2A. This configuration uses one laser 2000 (wavelength $\lambda_1 \sim 543$ nm). The laser beam is first split into two laser beams, $LB_1$ and $LB_2$ with an acoustic optical modulator (AOM) 2100 with a modulation frequency of $\Delta v$. Two laser beams, $LB_1$ and $LB_2$, will have different light frequencies, $v_1$ and $v_2$, respectively. The difference between $v_1$ and $v_2$ is $\Delta v$. For example, $\Delta v$ used is 200 MHz, but the exact number is not important as long as the period of oscillation (5 ns) is much shorter than the camera exposure time (i.e., a period for a detector included in the camera to be exposed to capture an image). $v_1$ is $(c/\lambda_1)$, and $v_2$ is $(c/\lambda_1) - \Delta v$ (which is 200 MHz in the current configuration). $\Delta v$ used may be set at between 5 MHz and 5 GHz, for example. Thus, the AOM generates a least two beams $v_1$ and $v_1$. In FIG. 2A, reference numbers of FIG. 1 are used for avoiding redundant explanations.

In one embodiment, the number of AOMs needed is the number of laser beams minus one. For two laser beams, only one AOM is needed.

The first laser beam, $LB_1$, with the light frequency $v_1$ is expanded and spatially filtered by two lenses (L1 1017 and L2 1018) and a pinhole 1112. The laser beam is split into a reference beam ($RB_1$, 1915) and an object beam ($OB_1$, 1950). The reference beam, $RB_1$, is focused by a lens (L3 1007) and diverging to the camera 1009 via the beam splitters (1019, 1004), mirrors (1005, 1006).

The object beam, $OB_1$, is angle-controlled by the 2D galvo mirror 2020 and going through a microscope, which consists of a condenser 1015 and objective lens 1016, and the sample 1118. The reference beam, $RB_1$, and the object beam, $OB_1$ 1915, are combined on the camera 1009 with an angle between them, via the beam splitters (1004, 1018), mirrors (1005, 1006), and the lens 1007. The wavefront curvatures of $RB_1$ and $OB_1$ are matched so that one set of parallel fringes due to two beams interference is formed on the camera when there is no sample in the object beam, $OB_1$, path. Once a sample is placed in the object beam $OB_1$, that sample changes the light phase such that the wavefront of the object beam, $OB_1$, is modulated. This causes the parallel fringes to be modulated. The modulation of the fringes is used to extract the refractive index property of the sample integrated along the direction of the object beam, $OB_1$.

Another laser beam, $LB_2$, from the same laser is split with the light frequency $v_2$ is expanded and spatially filtered by two lenses (1001, 1003) and a pinhole 1002. The laser beam is split into a reference beam ($RB_2$, 1910) and an object beam ($OB_2$, 1955). The reference beam, $RB_2$, is focused by a lens (L3) and diverging to the camera via the mirrors (1005, 1006), the lens 1007, and the beam splitter 1018. The object beam, $OB_2$, is angle controlled by the 2D galvo mirror 1010 and going through a microscope, which consists of the condenser and objective lens (1015, 1017), and the sample 1118. The reference beam, $RB_2$, and the object beam, $OB_2$, are combined on the camera with an angle between them. The wavefront curvatures of $RB_2$ and $OB_2$ are matched so that one set of parallel fringes due to two beams interference is formed on the camera when there is no sample in the object beam, $OB_2$, path. Once a sample is placed in the object beam, $OB_2$, that sample changes the light phase such that the wavefront of the object beam, $OB_2$, is modulated. This causes the parallel fringes to be modulated. The modulation of the fringes is used to extract the refractive index property of the sample integrated along the direction of the object beam, $OB_2$.

Figure 2B:
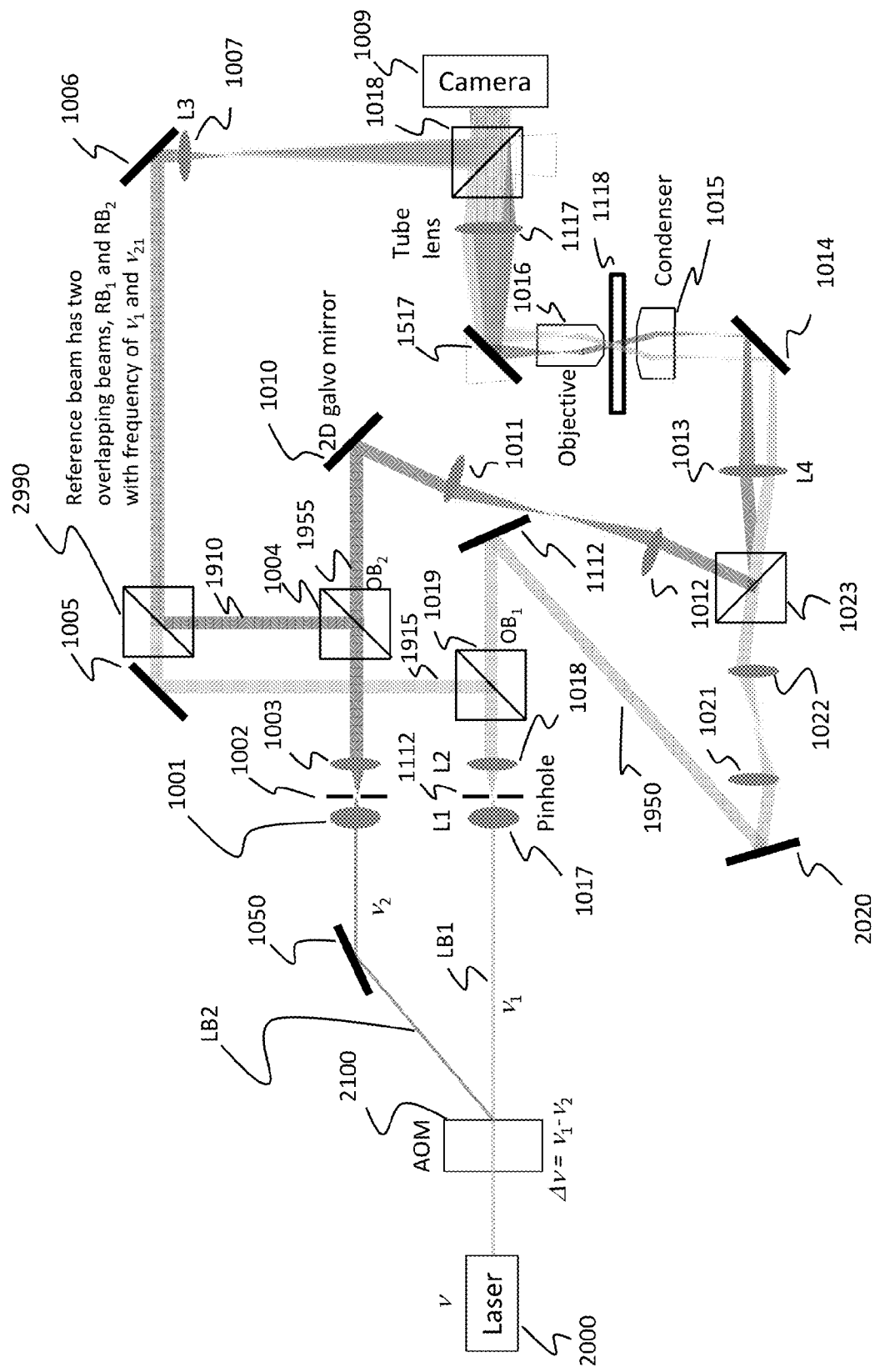

The first reference beam 1915 may be multiplexed with the second object beam 1955 through the beam splitter 1004. To avoid such multiplex, the beam splitters 1019, 1004, and 2990 can be arranged as described in FIG. 2B. The first reference beam 1915 is overlapped with the second reference beam 1910 through the beam splitter 2990.

The orientation of the first set of fringes, generated by the interferences between $RB_1$ and $OB_1$ should be different from that of the second set of fringes, generated by the interferences between $RB_2$ and $OB_2$ to create the separation between two corresponding images in the Fourier space.

Furthermore, two laser beams, $LB_1$ and $LB_2$, do interfere and give other sets of interference fringes. However, these sets of interference fringes are changing in space with a frequency of $\Delta v$. Therefore, effectively, the fringes are averaged out in time as long as the camera integration time is much longer than the inverse of $\Delta v$. This condition can be met because the camera integration time can be set on the order of milli-second (or mini-second), whereas the inverse of $\Delta v$ can be set on the order of sub micro-second.

2D galvo mirrors (1010, 2020) are positioned on the conjugate planes of the sample plane so the angles of the beams coming from the 2D galvo mirrors correspond to the illumination angles on the sample 1118. The amount of the angle movement depends on (1) the amount of the illumination angle range and the magnification of the optical relay system between the galvo mirror and the sample. Instead of the 2D galvo mirror 2020 to change an incident angle of the object beam $OB_1$ to the sample, a mirror which is not supposed to move can be used.

In general, Electric field of each beam is explained by the following equations, when phase difference between reference beam 1 and reference beam 2 is assumed to be zero at t=0:

$$E_{r1}(x,y,t)=E_1\exp[i(k_{r1,x}\cdot x+k_{r1,y}\cdot y-2\pi v_1 t)],$$

$$E_{o1}(x,y,t)=E_1\exp[i(k_{o1,x}\cdot x+k_{o1,y}\cdot y-2\pi v_1 t-\phi_1)],$$

$$E_{r2}(x,y,t)=E_2\exp[i(k_{r2,x}\cdot x+k_{r2,y}\cdot y-2\pi v_2 t)],$$

$$E_{o2}(x,y,t)=E_2\exp[i(k_{o2,x}\cdot x+k_{o2,y}\cdot y-2\pi v_2 t-\phi_2)].$$

$E_{r1}$, $E_1$, $E_{o1}$, $E_{r2}$, $E_2$, and $E_{o2}$ are related to electric fields. $k_{r1,x}$, $k_{r1,y}$, $k_{o1,x}$, $k_{o1,y}$, $k_{r2,x}$, $k_{r2,y}$, $k_{o2,x}$, and $k_{o2,y}$ are related to the beam angles. $\Phi_1$ and $\Phi_2$ are related to phase.

For experiment, the beam angles and intensities can be arranged as follows:

$$k_{r1,x}=k_{r1,y}=0, k_{r2,x}=k_{r2,y}=0,$$

$$k_{o1,x}=k_1, k_{o1,y}=0, k_{o2,x}=0, k_{o2,y}=k_2, \text{then,}$$

$$E_{r1}(x,y,t)=\sqrt{I_{r1}}\exp[i(-2\pi v_1 t)],$$

$$E_{o1}(x,y,t)=\sqrt{I_{o1}}\exp[i(k_1\cdot x-2\pi v_1 t-\phi_1)],$$

$$E_{r2}(x,y,t)=\sqrt{I_{r2}}\exp[i(-2\pi v_2 t)],$$

$$E_{o2}(x,y,t)=\sqrt{I_{o2}}\exp[i(k_2\cdot y-2\pi v_2 t-\phi_2)].$$

$I_{r1}$, $I_{o1}$, $I_{r2}$, and $I_{o2}$ mean intensity of the reference beam 1, object beam 1, reference beam 2, and object beam 2, respectively.

$E_{total}$ and $I_{total}$ mean the total electric field and the total intensity, respectively.

$$E_{total}(x,y,t) = E_{r1}(x,y,t) + E_{o1}(x,y,t) + E_{r2}(x,y,t) + E_{o2}(x,y,t),$$

$$I_{total}(x,y,t) = E_t(x,y,t)\cdot E_t^*(x,y,t) =$$

$$[E_{r1}(x,y,t)\cdot E_{r1}^*(x,y,t) + E_{o1}(x,y,t)\cdot E_{o1}^*(x,y,t) +$$

$$E_{r2}(x,y,t)\cdot E_{r2}^*(x,y,t) + E_{o2}(x,y,t)\cdot E_{o2}^*(x,y,t)] +$$

$$[E_{r1}(x,y,t)\cdot E_{o1}^*(x,y,t) + E_{o1}(x,y,t)\cdot E_{r1}^*(x,y,t)] +$$

$$[E_{r2}(x,y,t)\cdot E_{o2}^*(x,y,t) + E_{o2}(x,y,t)\cdot E_{r2}^*(x,y,t)] +$$

$$[E_{r1}(x,y,t)\cdot E_{r2}^*(x,y,t) + E_{r2}(x,y,t)\cdot E_{r1}^*(x,y,t)] +$$

$$[E_{o1}(x,y,t)\cdot E_{o2}^*(x,y,t) + E_{o2}(x,y,t)\cdot E_{o1}^*(x,y,t)] + [E_{r1}(x,y,t)\cdot E_{o2}^*(x,y,t) +$$

$$E_{o2}(x,y,t)\cdot E_{r1}^*(x,y,t)] + [E_{r2}(x,y,t)\cdot E_{o1}^*(x,y,t) + E_{o1}(x,y,t)\cdot E_{r2}^*(x,y,t)]$$

The total intensity $I_{total}$ has 16 products (4 fields times 4 fields). Those 16 products can be grouped into 7 terms. The first term is the sum of the intensities all four beams. The second term is the interference term due to the $v_1$ reference beam and $v_1$ object beam. The third term is the interference term due to the $v_2$ reference beam and $v_2$ object beam. The fourth term is the interference term due to the $v_1$ reference beam and $v_2$ reference beam. The fifth term is the interference term due to the $v_1$ object beam and $v_2$ object beam. The sixth term is the interference term due to the $v_1$ reference beam and $v_2$ object beam. The seventh term is the interference term due to the $v_1$ object beam and $v_2$ reference beam.

Since $E_{r1}$, $E_{o1}$, $E_{r2}$, and $E_{o2}$ can be rewritten as follows.

$$E_{r1}(x,y,t)=E_1\exp[i(k_{r1,x}\cdot x+k_{r1,y}\cdot y-2\pi v_1 t)],$$

$$E_{o1}(x,y,t)=E_1\exp[i(k_{o1,x}\cdot x+k_{o1,y}\cdot y-2\pi v_1 t-\phi_1)],$$

$$E_{r2}(x,y,t)=E_2\exp[i(k_{r2,x}\cdot x+k_{r2,y}\cdot y-2\pi v_2 t)],$$

$$E_{o2}(x,y,t)=E_2\exp[i(k_{o2,x}\cdot x+k_{o2,y}\cdot y-2\pi v_2 t-\phi_2)].$$

Therefore, $I_{total}$ can be rewritten as follows.

$$I_{total}(x,y,t) = E_t(x,y,t)\cdot$$

$$E_t^*(x,y,t) = [I_{r1}+I_{o1}+I_{r2}+I_{o2}] + 2\cdot\sqrt{I_{r1}\cdot I_{o1}}\cdot\cos(k_1\cdot x-\phi_1) +$$

$$2\cdot\sqrt{I_{r2}\cdot I_{o2}}\cdot\cos(k_2\cdot y-\phi_2) + [\sqrt{I_{r1}\cdot I_{r2}}\cdot\cos(2\pi\cdot\Delta v\cdot t)] +$$

$$[\sqrt{I_{o1}\cdot I_{o2}}\cdot\cos((k_1\cdot x-k_2\cdot y)-2\pi\cdot\Delta v\cdot t-(\phi_1-\phi_2))] + [\sqrt{I_{r1}\cdot I_{o2}}\cdot$$

$$\cos((k_2\cdot y-2\pi\cdot\Delta v\cdot t)-\phi_2)] + [\sqrt{I_{r2}\cdot I_{o1}}\cdot$$

$$\cos((k_1\cdot x-2\pi\cdot\Delta v\cdot t)-\phi_1)]$$

$I_{total}$ can be also rewritten as follows.

$$I_{total}(x,y) =$$

$$\int_t \{[I_{r1}+2\cdot\sqrt{I_{r1}\cdot I_{o1}}\cdot\cos(k_1\cdot x-\phi_1)+I_{o1}] + [I_{r2}+2\cdot\sqrt{I_{r2}\cdot I_{o2}}\cdot$$

$$\cos(k_2\cdot y-\phi_2)+I_{o2}] + [\sqrt{I_{r1}\cdot I_{r2}}\cdot\cos(2\pi\cdot\Delta v\cdot t)] +$$

$$[\sqrt{I_{o1}\cdot I_{o2}}\cdot\cos((k_1\cdot x-k_2\cdot y)-2\pi\cdot\Delta v\cdot t-(\phi_1-\phi_2))] +$$

$$[\sqrt{I_{r1}\cdot I_{o2}}\cdot\cos((k_2\cdot y-2\pi\cdot\Delta v\cdot t)-\phi_2)] +$$

$$[\sqrt{I_{r2}\cdot I_{o1}}\cdot\cos((k_1\cdot x-2\pi\cdot\Delta v\cdot t)-\phi_1)]\}$$

The total light intensity (denoted as $I_{total}$) can be grouped into three groups. The first group is the interference pattern (vertical fringes, FIG. 5) from the first beam only. The second group is the interference pattern (horizontal fringes) from the second beam only. The third group (the rest of the terms) is the interference from all other beam combinations. This third group behaves very differently for the case of two beams having the same frequency or different frequencies. When two beams have the same frequency, the third group is "time-independent" and a diagonal interference pattern appears and gives rise to the "cross talk." When two beams have different frequencies, the third group is "time-dependent" and the time average goes to zero. This is the fundamental reason that the "cross talk" fringes goes away.

$$I_{total}(x, y, t) = [I_{r1} + I_{o1} + I_{r2} + I_{o2}] + 2 \cdot \sqrt{I_{r1} \cdot I_{o1}} \cdot \cos(k_1 \cdot x - \phi_1) +$$
$$2 \cdot \sqrt{I_{r2} \cdot I_{o2}} \cdot \cos(k_2 \cdot y - \phi_2) + [\sqrt{I_{r1} \cdot I_{r2}} \cdot \cos(2\pi \cdot \Delta v \cdot t)] +$$
$$[\sqrt{I_{o1} \cdot I_{o2}} \cdot \cos((k_1 \cdot x - k_2 \cdot y) - 2\pi \cdot \Delta v \cdot t - (\phi_1 - \phi_2))] +$$
$$[\sqrt{I_{r1} \cdot I_{o2}} \cdot \cos((k_2 \cdot y - 2\pi \cdot \Delta v \cdot t) - \phi_2)] +$$
$$[\sqrt{I_{r2} \cdot I_{o1}} \cdot \cos((k_1 \cdot x - 2\pi \cdot \Delta v \cdot t) - \phi_1)]$$

In order to get the best contrast ratio (100%), the intensities of all four beams should be the same. The following simulated results are calculated with the same beam intensities for simplicity. Since the intensities are not the same in general, this will affect the contrast ratios but not the conclusions we present.

When only $v_1$ (or $v_2$) is present, the result is a well-known interference fringe pattern which is time independent.

Figure 5:
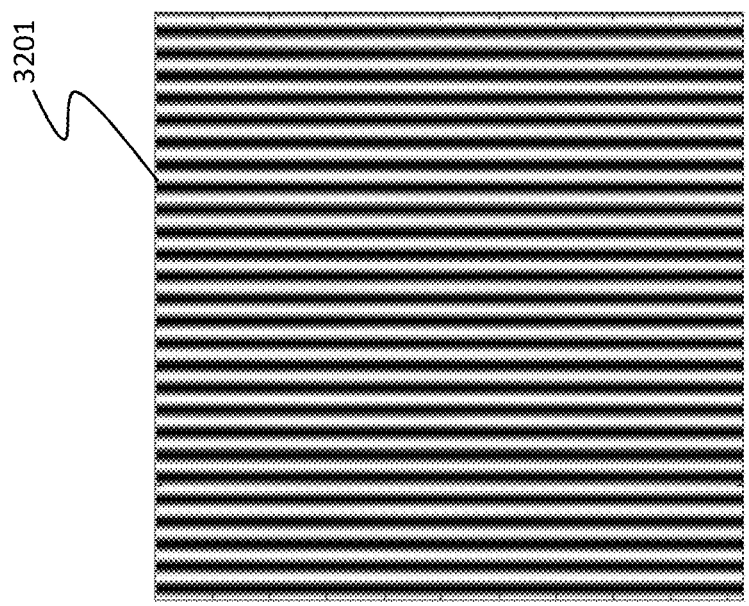
FIG. 5 is an interference fringe pattern.

The interference fringe pattern due to the reference beam $r_1$ and the object beam $o_1$ is shown in FIG. 5. The pattern is time-independent.

$$I_{total}(x,y,t) \Rightarrow I_1(x,y) = [I_{r1} + I_{o1}] + 2 \cdot \sqrt{I_{r1} \cdot I_{o1}} \cdot \cos(k_1 \cdot x - \phi_1)$$

Figure 6:
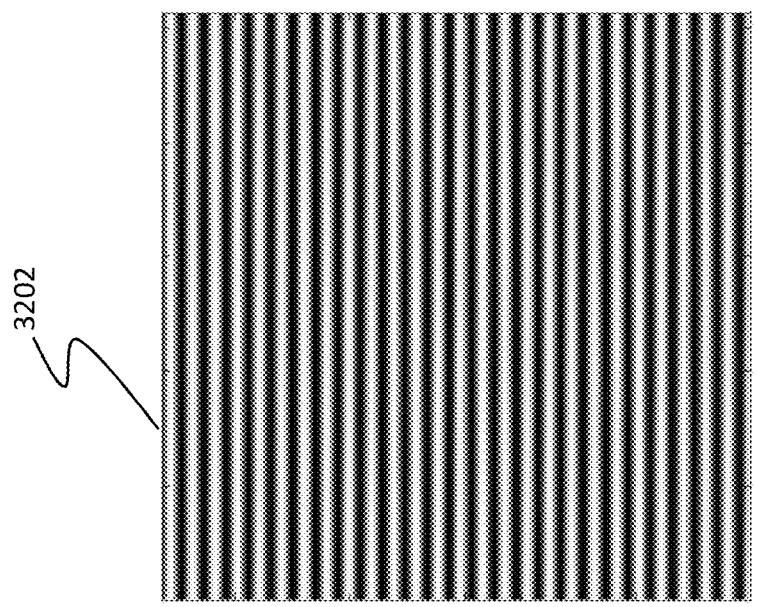
FIG. 6 is an interference fringe pattern.

The interference fringe pattern due to the reference beam $r_2$ and the object beam $o_2$ is shown in FIG. 6. The pattern is time-independent.

$$I_{total}(x,y,t) \Rightarrow I_2(x,y) = [I_{r2} + I_{o2}] + 2 \cdot \sqrt{I_{r2} \cdot I_{o2}} \cdot \cos(k_2 \cdot x - \phi_2)$$

The time dependent parts of $I_{total}$ can be examined. In order to get more insight, we will do it gradually. First, we examine the interference between reference beam 1 and reference beam 2:

$$I_{total}(x,y,t) \Rightarrow [I_{r1} + I_{r2}] + [\sqrt{I_{r1} \cdot I_{r2}} \cdot \cos(2\pi \cdot \Delta v \cdot t)] \Delta v = 200 \text{ MHz}$$

Figure 7A:
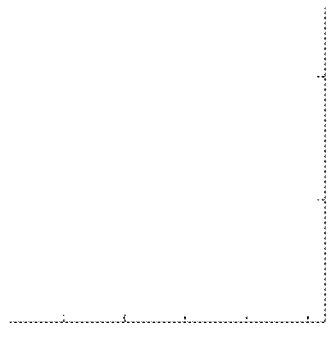
FIGS. 7A to 7D are calculated images based on interference between reference beams 1 and 2.
Figure 7B:
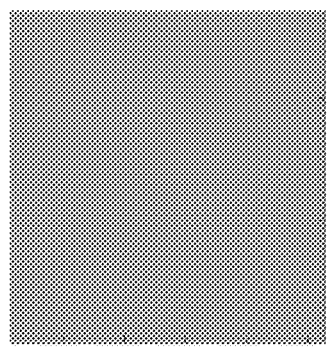
Figure 7C:
Figure 7D:
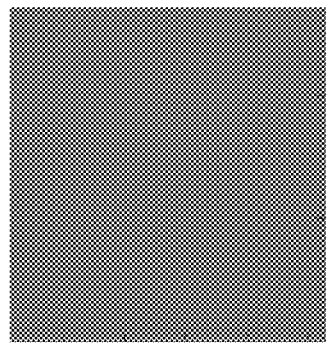
Figure 8A:
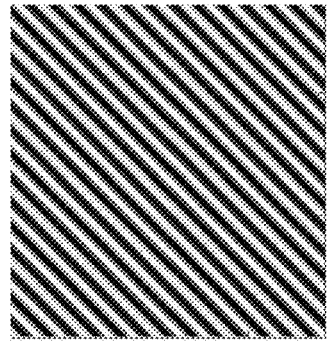
FIGS. 8A to 8D are calculated images based on interference between object beams 1 and 2.
Figure 8B:
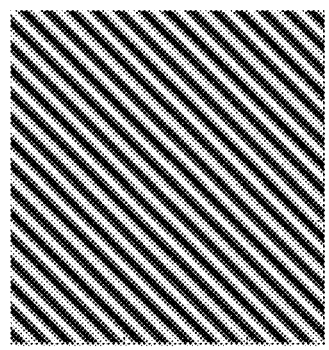
Figure 8C:
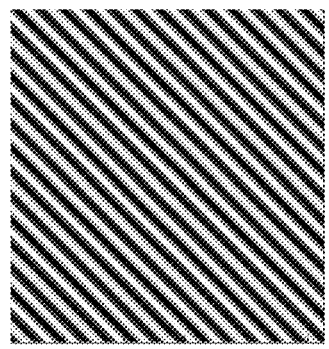
Figure 8D:
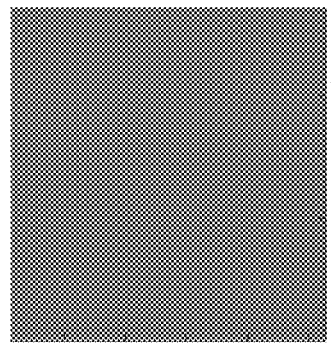

As shown in FIGS. 7A-7D, No interference fringe pattern is observed when the time t=0, 1 ns, and 2.5 ns. As noted in the equation above, there is no spatial component to the interference pattern from the two reference beams. However, there is a temporal component to the intensity which is averaged away as shown in FIG. 7D.

Next, we examine the interference between object beam 1 and object beam 2:

$$I_{total}(x,y,t) \Rightarrow [I_{o1} + I_{o2}] + [\sqrt{I_{o1} \cdot I_{o2}} \cdot \cos(k_1 \cdot x - k_2 \cdot y) - 2\pi \cdot \Delta v \cdot t(\phi_1 - \phi_2))] \Delta v = 200 \text{ MHz}$$

As shown in FIGS. 8A-8D, fringe patterns are observed when the time t=0, 1 ns, and 2.5 ns. When the time is averaged, we can see no interference fringes pattern in FIG. 8D. When two beams (object beams 1 and 2) have the same frequency, it becomes "time-independent" and a diagonal interference pattern appears and gives rise to the "cross talk." However, when two beams have different frequencies, it becomes "time-dependent" and the time average goes to zero.

As shown in FIGS. 7 and 8, both time averaged images do not have interference pattern because the interference terms are time dependent and get averaged out when the exposure time of the image sense by a camera is much greater than the period of the oscillation of $\Delta v$.

Next, the interference between reference beam 1 and object beam 2 is examined according to the following element and the result is shown in FIGS. 9A-9D.

$$I_{total}(x,y,t) \Rightarrow [I_{r1} + I_{o2}] + [\sqrt{I_{r1} \cdot I_{o2}} \cdot \cos(k_2 \cdot y - 2\pi \cdot \Delta v \cdot t) - \phi_2))] \Delta v = 200 \text{ MHz}$$

When two beams (reference beam 1 and object beam 2) have the same frequency, it becomes "time-independent" and a diagonal interference pattern appears and gives rise to the "cross talk." However, when two beams have different frequencies, it becomes "time-dependent" and the time average goes to zero.

Next, the interference between reference beam 2 and object beam 1 is examined according to the following element and the result is shown in FIGS. 10A-10D.

$$I_{total}(x,y,t) \Rightarrow [I_{o1} + I_{r2}] + [\sqrt{I_{r2} \cdot I_{o1}} \cdot \cos(k_1 \cdot x - 2\pi \cdot \Delta v \cdot t) - \phi_1))] \Delta v = 200 \text{ MHz}$$

When two beams (reference beam 2 and object beam 1) have the same frequency, it becomes "time-independent" and a diagonal interference pattern appears and gives rise to the "cross talk." However, when two beams have different frequencies, it becomes "time-dependent" and the time average goes to zero.

As shown in FIGS. 9D and 10D, both time averaged images do not have interference pattern because the interference terms are time dependent and get averaged out when the exposure time of the image sense is much greater than the period of the oscillation of $\Delta v$.

Finally, the interference pattern is examined when all beams are on the following equation, and the result is shown in FIGS. 11A-11D.

$$I_{total}(x, y, t) = [I_{r1} + I_{o1} + I_{r2} + I_{o2}] + 2 \cdot \sqrt{I_{r1} \cdot I_{o1}} \cdot \cos(k_1 \cdot x - \phi_1) +$$
$$2 \cdot \sqrt{I_{r2} \cdot I_{o2}} \cdot \cos(k_2 \cdot y - \phi_2) + [\sqrt{I_{r1} \cdot I_{r2}} \cdot \cos(2\pi \cdot \Delta v \cdot t)] +$$
$$[\sqrt{I_{o1} \cdot I_{o2}} \cdot \cos((k_1 \cdot x - k_2 \cdot y) - 2\pi \cdot \Delta v \cdot t - (\phi_1 - \phi_2))] +$$
$$[\sqrt{I_{r1} \cdot I_{o2}} \cdot \cos((k_2 \cdot y - 2\pi \cdot \Delta v \cdot t) - \phi_2)] +$$
$$[\sqrt{I_{r2} \cdot I_{o1}} \cdot \cos((k_1 \cdot x - 2\pi \cdot \Delta v \cdot t) - \phi_1)],$$
$$\Delta v = 200 \text{ MHz}$$

Very interestingly, the time averaged image shows clear interference pattern as shown in FIG. 11D. Mathematically, it is because there are still two interference terms (in the equation shown above) that are stationary. Once we drop the time dependent interference terms due to time averaging, the equation becomes as follows.

$$I_{total}(x,y,t) \Rightarrow I_1(x,y) + I_2(x,y) = [I_{r1} + 2 \cdot \sqrt{I_{r1} \cdot I_{o1}} \cdot \cos(k_1 \cdot x - \phi_1) + I_{o1}] + [I_{r2} + 2 \cdot \sqrt{I_{r2} \cdot I_{o2}} \cdot \cos(k_2 \cdot y - \phi_2) + I_{o2}]$$

Figure 12:
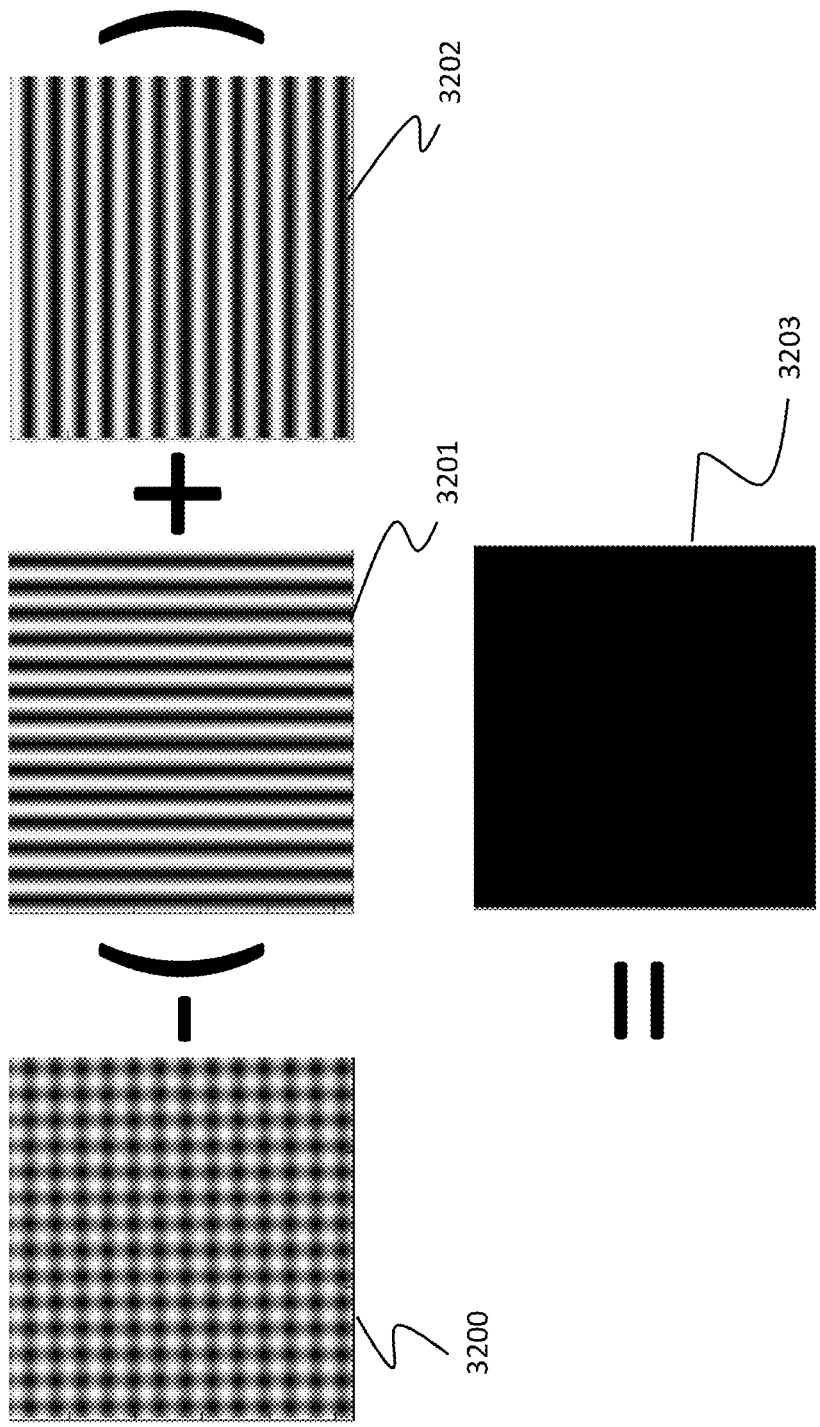
FIG. 12 is a chart to explain that no interference fringe is obtained.

More importantly, the total intensity is exactly the sum of two sets of interference fringes associated with $v_1$ and $v_2$ without any further interference between $v_1$ and $v_2$. This is exactly what we want. As shown in FIG. 12, when interference fringe patterns of FIG. 5 and FIG. 6 (3201 and 3202) are subtracted from the interference fringe of FIG. 11D (3200), no interference fringe of FIG. 12 (3203) is obtained.

Figure 13B:
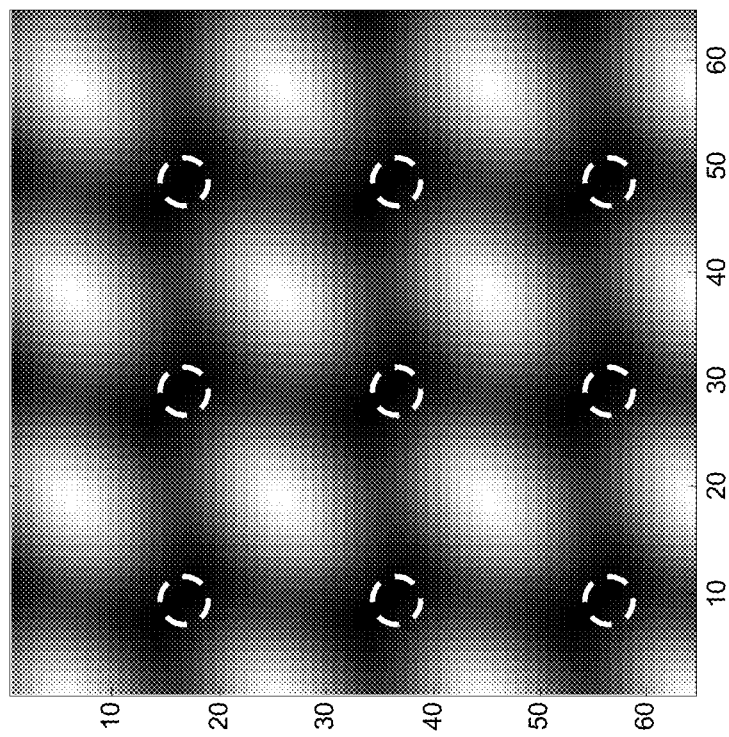
FIGS. 13A to 13Q are simulation results depending on time.
Figure 13C:
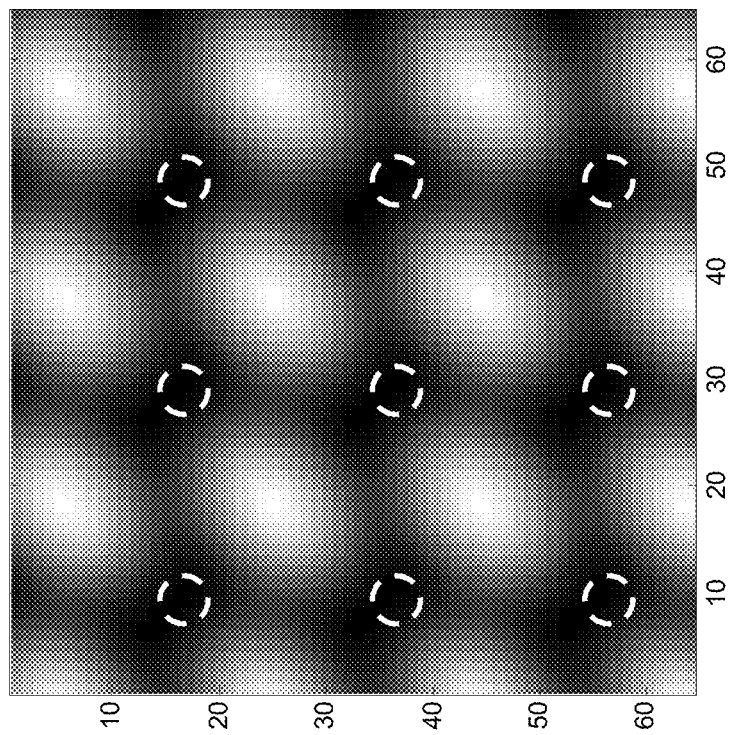
Figure 13E:
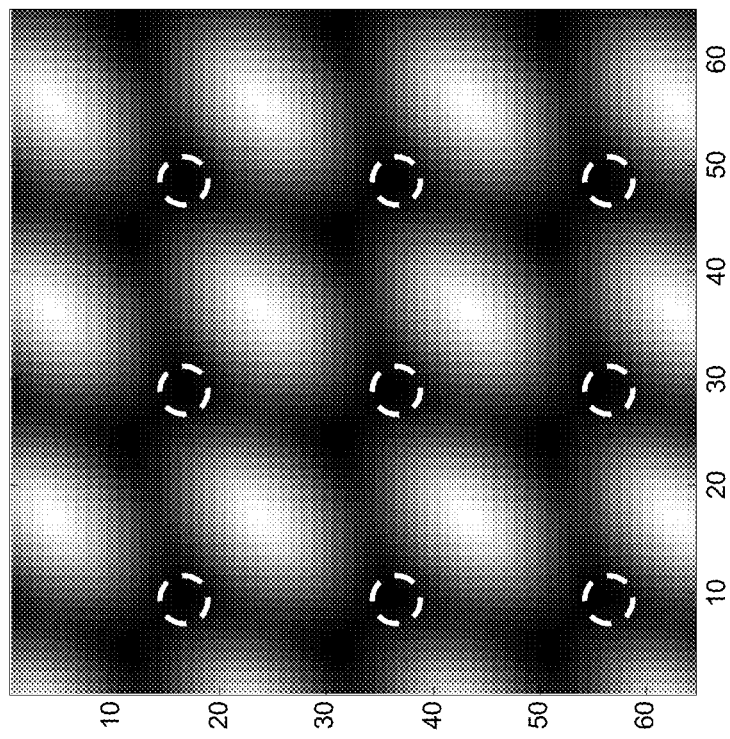
Figure 13F:
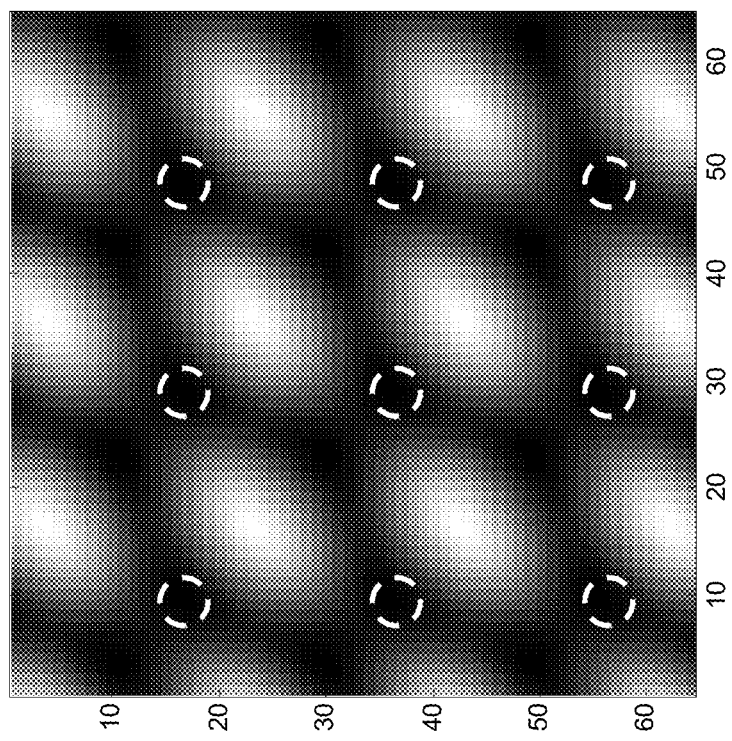
Figure 13G:
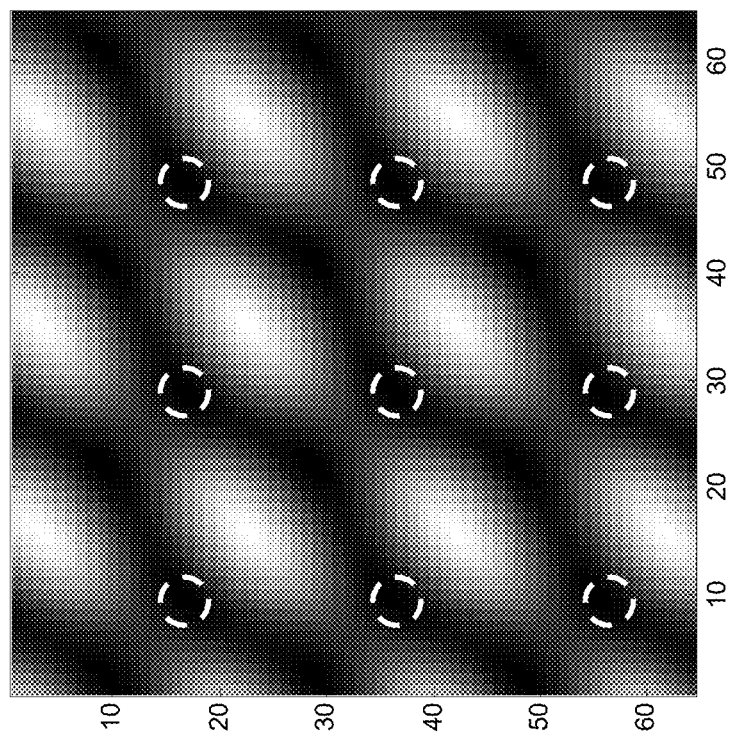
Figure 13H:
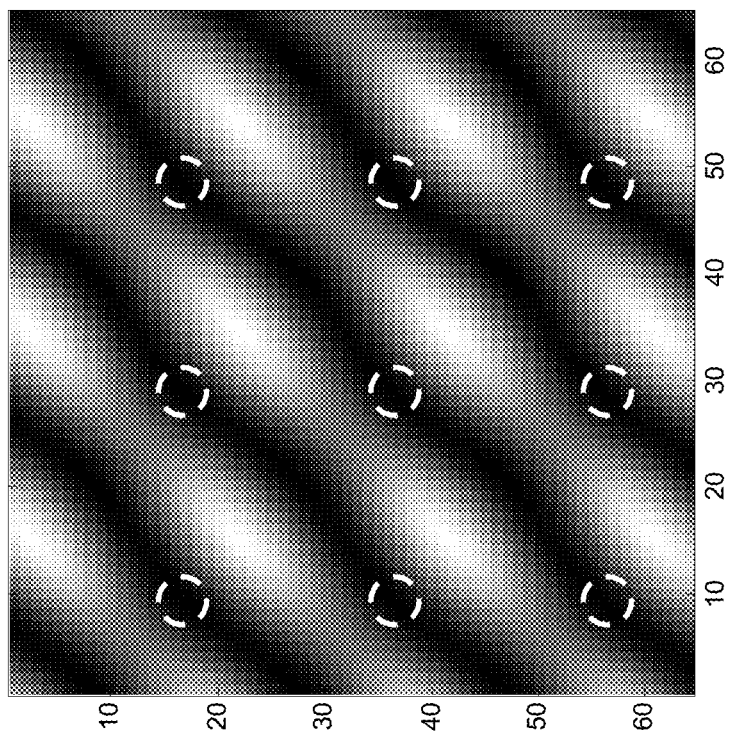
Figure 13I:
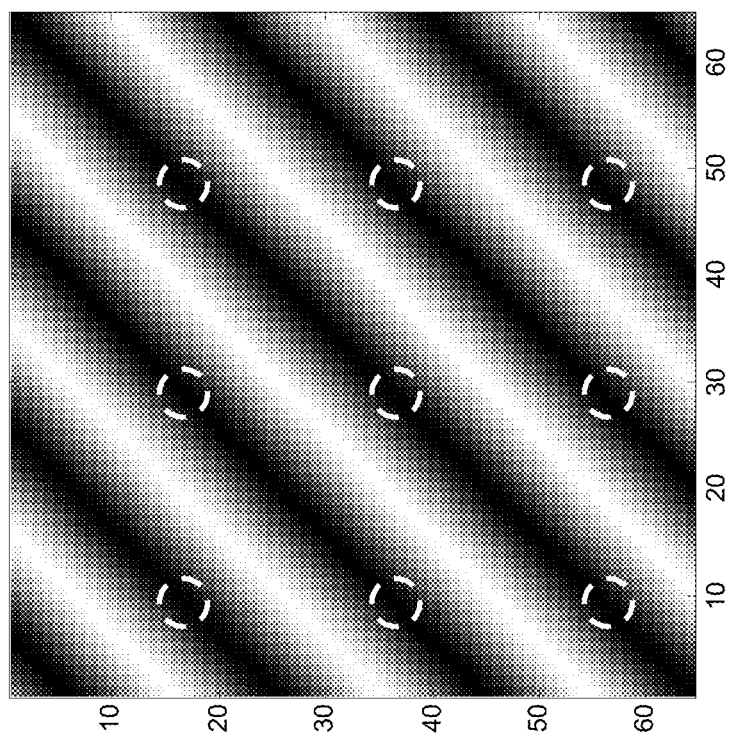
Figure 13J:
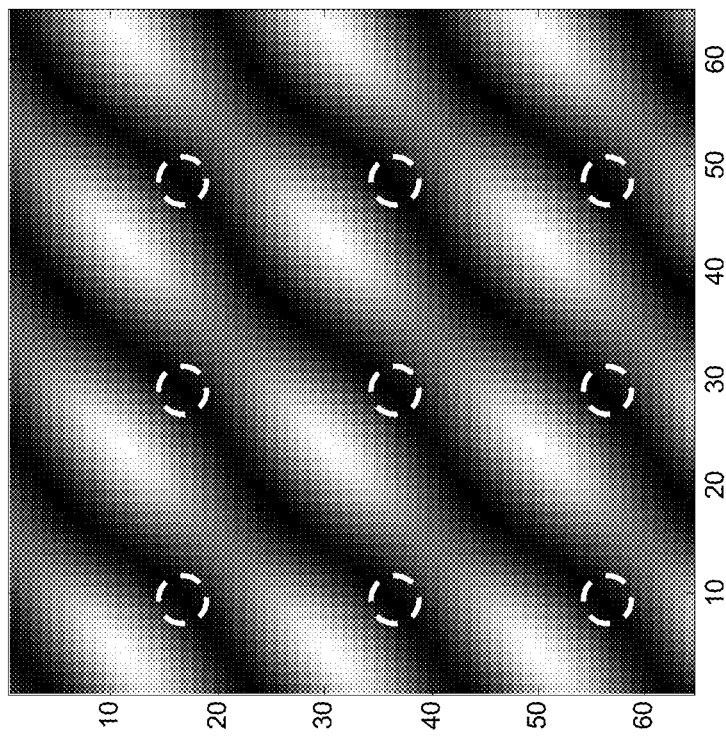
Figure 13K:
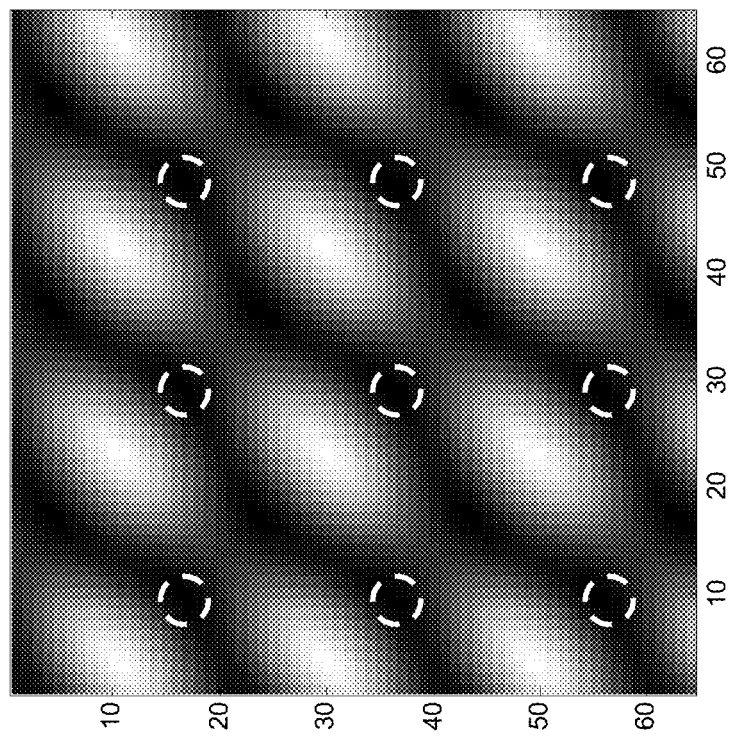
Figure 13L:
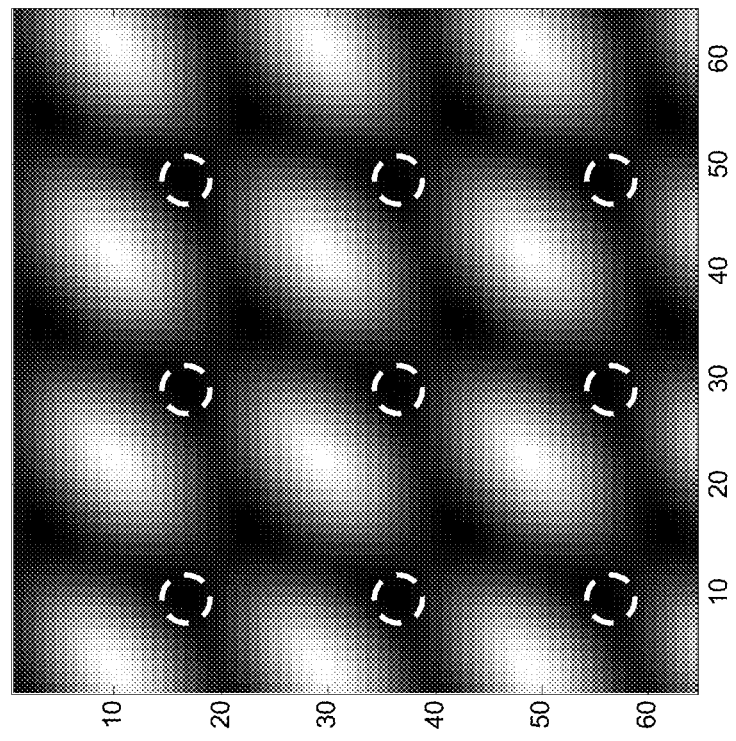
Figure 13M:
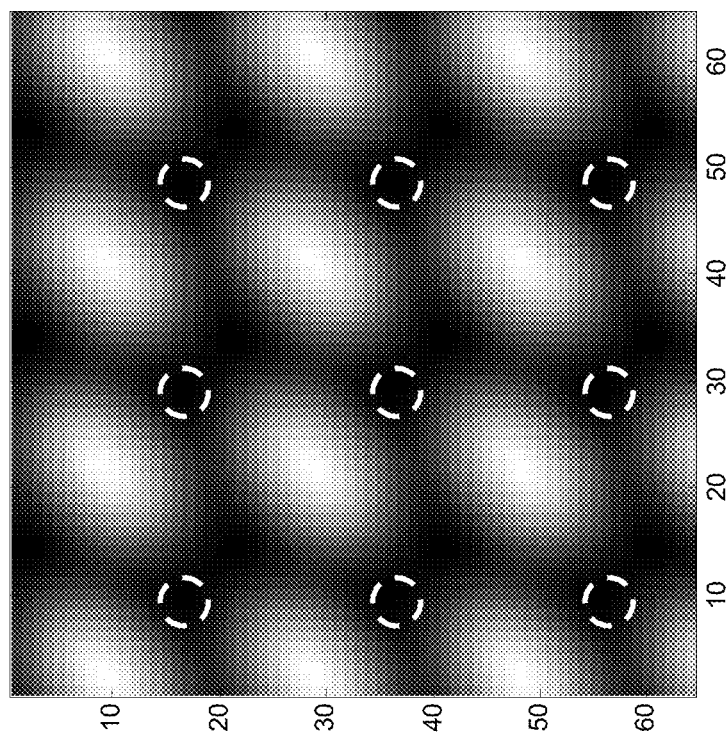
Figure 13N:
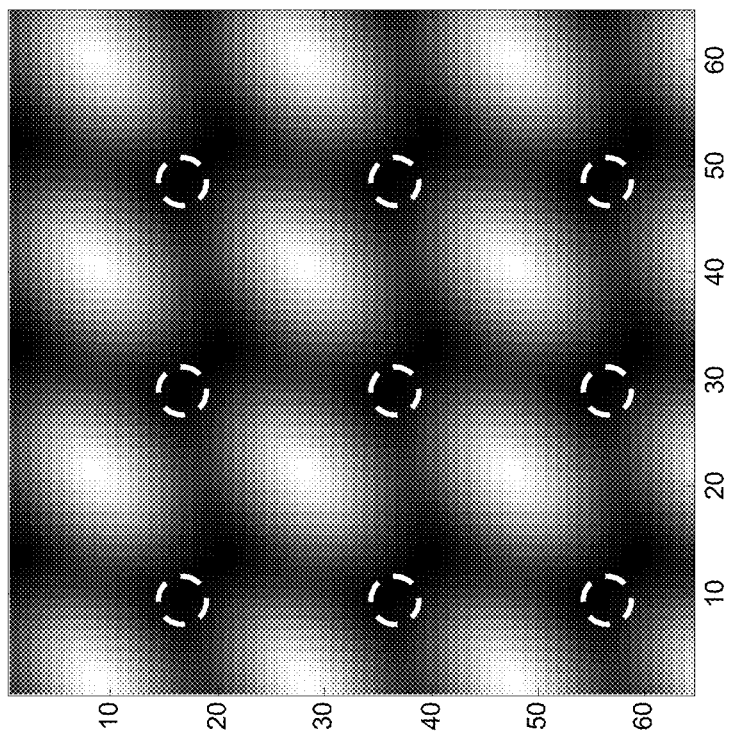
Figure 13O:
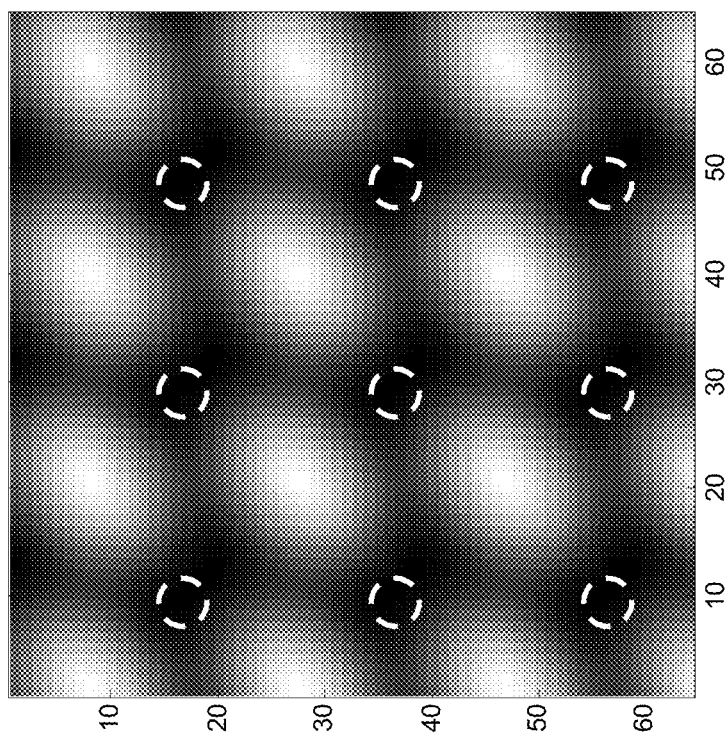
Figure 13P:
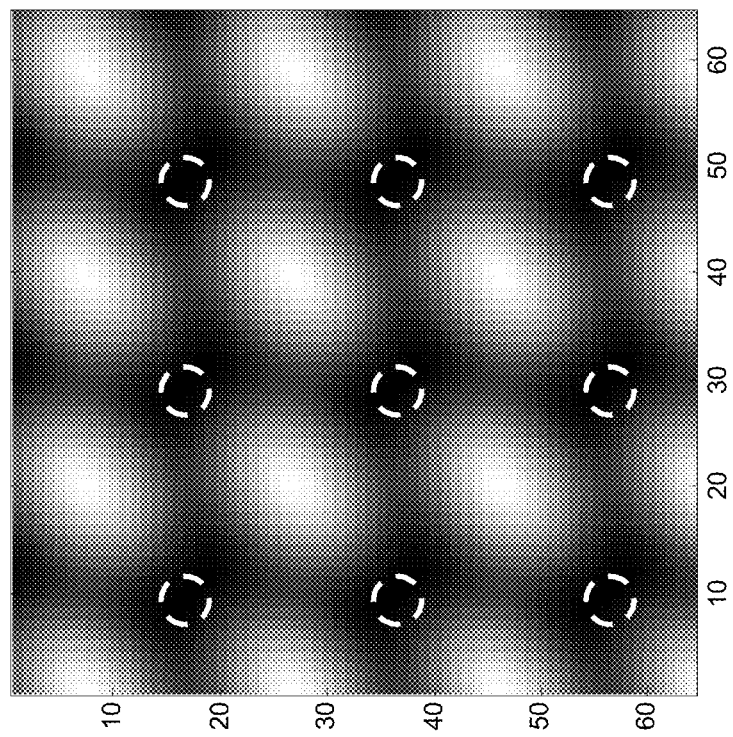
Figure 13Q:
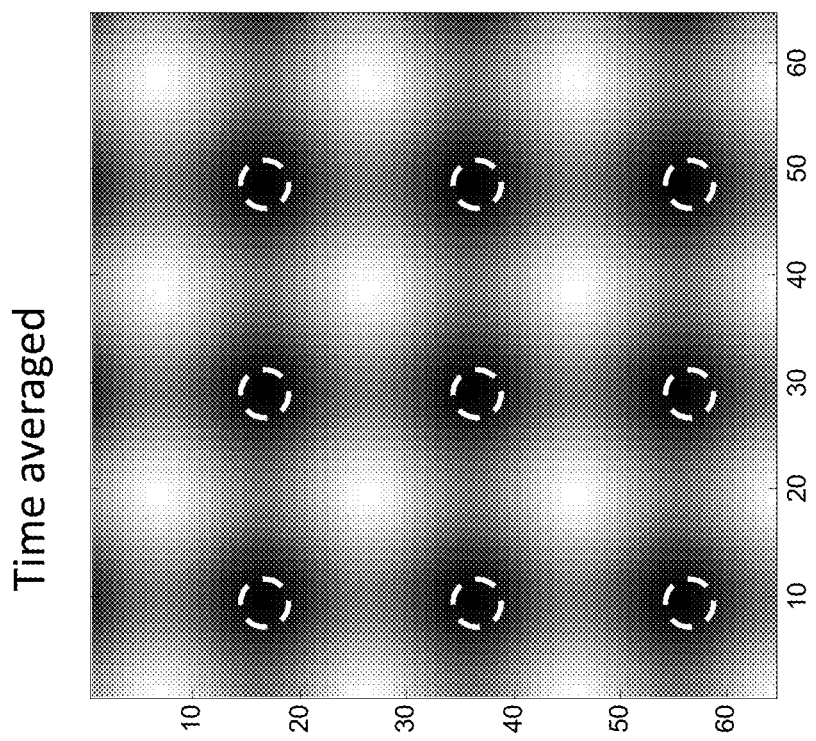

Simulation results according to the following equation are shown in FIGS. 13A-13Q.

$$I_t(x, y, t) = [I_{r1} + I_{o1} + I_{r2} + I_{o2}] + 2 \cdot \sqrt{I_{r1} \cdot I_{o1}} \cdot \cos(k_1 \cdot x - \phi_1) +$$
$$2 \cdot \sqrt{I_{r2} \cdot I_{o2}} \cdot \cos(k_2 \cdot y - \phi_2) + \left[\sqrt{I_{r1} \cdot I_{r2}} \cdot \cos(2\pi \cdot \Delta v \cdot t)\right] +$$
$$\left[\sqrt{I_{o1} \cdot I_{o2}} \cdot \cos((k_1 \cdot x - k_2 \cdot y) - 2\pi \cdot \Delta v \cdot t - (\phi_1 - \phi_2))\right] +$$
$$\left[\sqrt{I_{r1} \cdot I_{o2}} \cdot \cos((k_2 \cdot y - 2\pi \cdot \Delta v \cdot t) - \phi_2)\right] +$$
$$\left[\sqrt{I_{r2} \cdot I_{o1}} \cdot \cos((k_1 \cdot x - 2\pi \cdot \Delta v \cdot t) - \phi_1)\right],$$
$$\Delta v = 200 \text{ MHz}$$

As to the time-dependent terms, described as follows, in the total of intensity, an image with time-dependent terms is shown in FIG. 16A and a final image with all terms including time-dependent and time-independent terms is shown in FIG. 16B when Δv=0. It is understood that cross-talk can be observed due to the pair of beams (reference beams 1 and 2, object beams 1 and 2, reference beam 1 and object beam 2, reference beam 2 and object beam 1).

$$\left[\sqrt{I_{r1} \cdot I_{r2}} \cdot \cos(2\pi \cdot \Delta v \cdot t)\right] +$$
$$\left[\sqrt{I_{o1} \cdot I_{o2}} \cdot \cos((k_1 \cdot x - k_2 \cdot y) - 2\pi \cdot \Delta v \cdot t - (\phi_1 - \phi_2))\right] +$$
$$\left[\sqrt{I_{r1} \cdot I_{o2}} \cdot \cos((k_2 \cdot y - 2\pi \cdot \Delta v \cdot t) - \phi_2)\right] +$$
$$\left[\sqrt{I_{r2} \cdot I_{o1}} \cdot \cos((k_1 \cdot x - 2\pi \cdot \Delta v \cdot t) - \phi_1)\right]$$

However, there is no cross-talk of them when Δv is not equal to zero. An image with time-dependent terms is shown in FIG. 17A and a final image with all terms including time-dependent and time-independent terms is shown in FIG. 17B when Δv is not equal to zero.

Figure 18B:
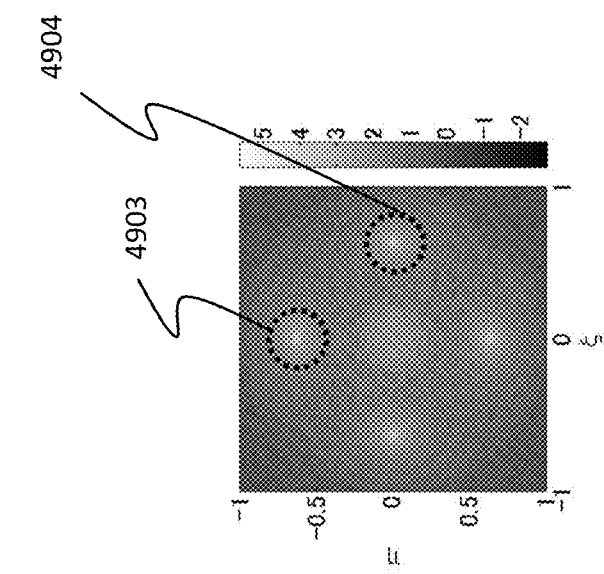
FIGS. 18A and 18B are Fourier-spectrums obtained by using a hologram image when there is the cross-talk and isn't it, respectively.
Figure 18A:
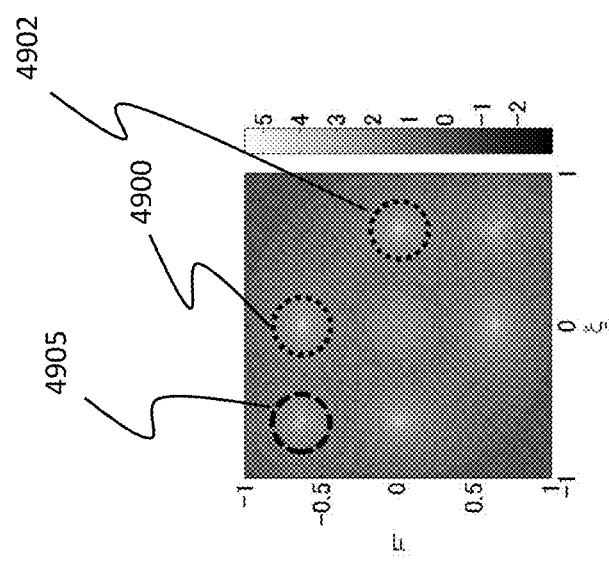

A Fourier-spectrum obtained by using a hologram image when there is the cross-talk is shown in FIG. 18A. References 4900 and 4902 drawn in round dot are information from illumination angle 2 and angle 1, respectively. The cross-talk area 4905 drawn in square dot is illustrated in FIG. 18A. Due to the cross-talk area, it may not be able to add further illumination angle. On the other hand, there is no cross-talk area in FIG. 18B. References 4903 and 4904 drawn in round dot are information from illumination angle 2 and angle 1, respectively. Therefore, it may be increase the number of illumination angles to obtain holograms.

With a phase object (a rectangle, which introduces a phase delay of π/2, in the center of the image plane), the simulation results showing time dependent images are shown in FIGS. 14A-14D.

Figure 15:
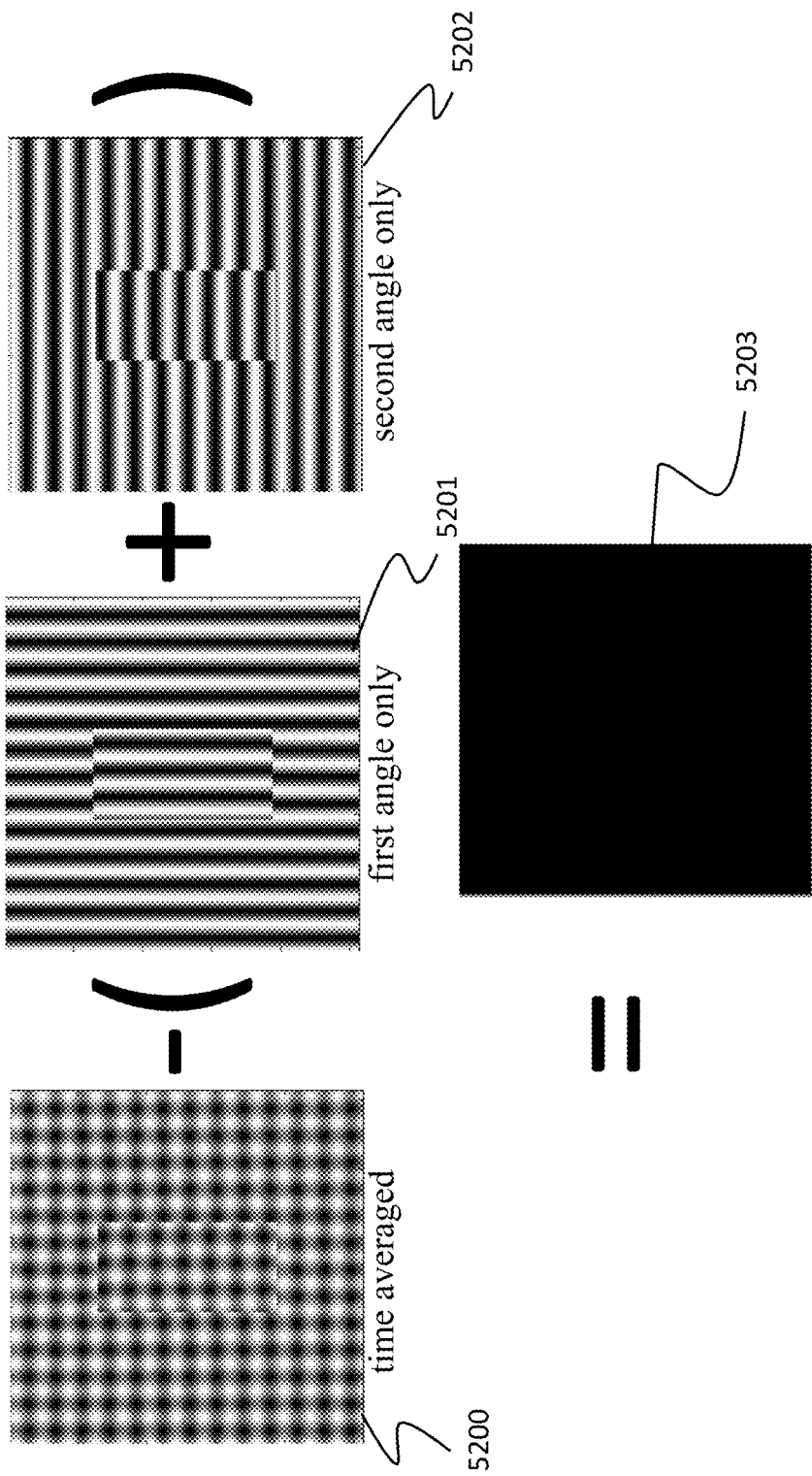
FIG. 15 is a chart to explain that no interference fringe is obtained.

Again, the total intensity is exactly the sum of two sets of interference fringes associated with $v_1$ and $v_2$ without any further interference between $v_1$ and $v_2$. This is exactly what we want. As shown in FIG. 15, when interference fringe patterns 5201 and 5202, which are obtained by using only one angle illumination per hologram, are subtracted from the interference fringe 5200, there is no interference fringe of FIG. 15 (5203).

Embodiment 2

Figure 3A:
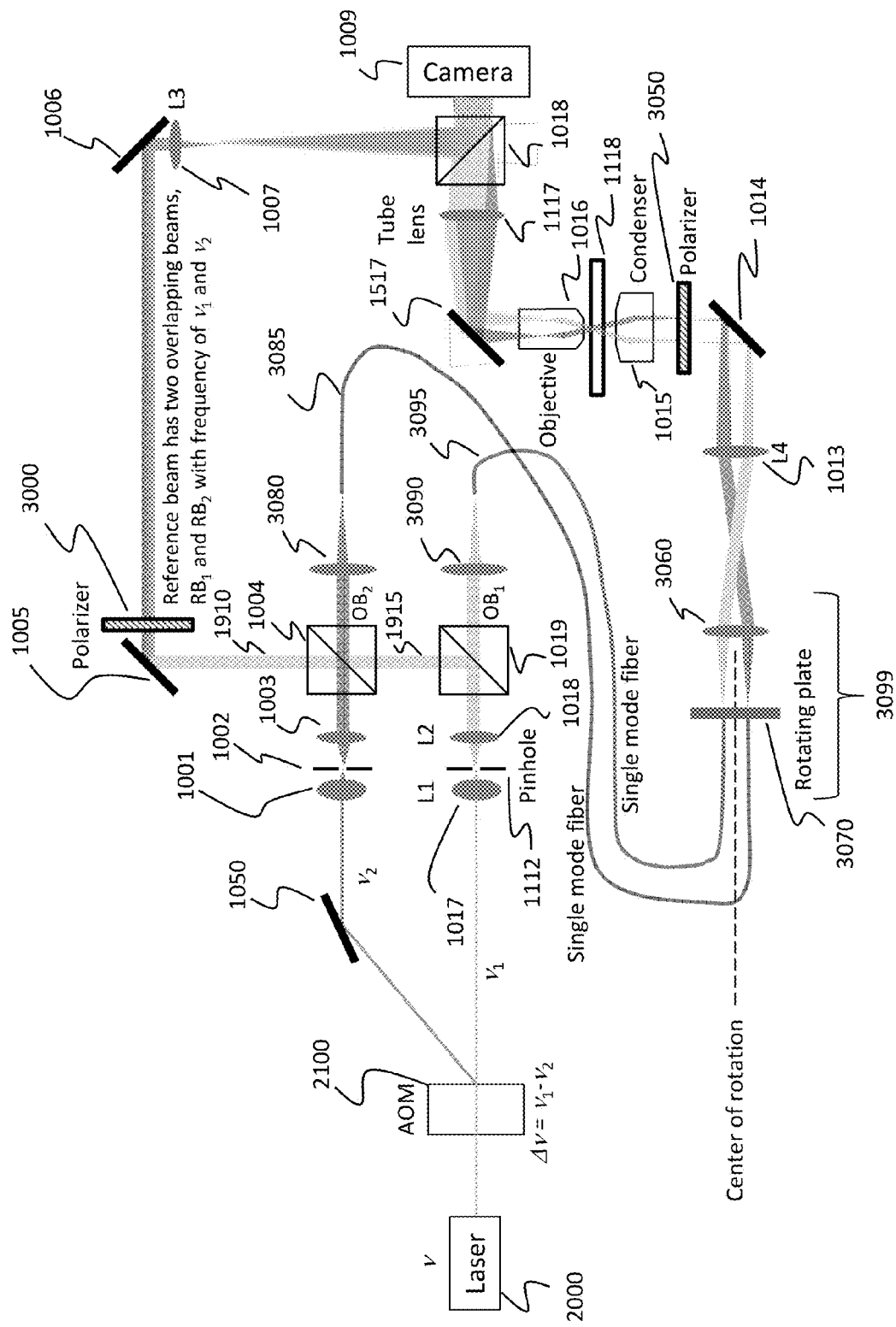
FIGS. 3A, 3B, and 3C illustrate an apparatus for generating holograms explained in an embodiment 2.

Another apparatus for generating composite multiplex holograms is illustrated in FIG. 3. This configuration uses one laser 2000. The laser beam is first split into two laser beams, $LB_1$ and $LB_2$ with an acoustic optical modulator (AOM) 2100 with a modulation frequency of Δv. Two laser beams, $LB_1$ and $LB_2$, will have different light frequencies, $v_1$ and $v_2$, respectively. The difference between $v_1$ and $v_2$ is Δv.

This configuration has all the benefits afforded by the configuration presented in FIG. 2A. Same reference number is used as in FIG. 2A for avoiding redundant explanations. In the previous configuration (FIG. 2A), the directions of two object beams, $OB_1$ and $OB_2$, are controlled independently using two galvo mirrors. Optical fibers 3085, 3095 and a rotating plate 3070 are used. The optical fiber may be a single mode fiber.

The embodiment 2 is useful for increasing the number of the object beams. In the configuration presented in FIG. 3A, the directions of two object beams, $LB_1$ and $LB_2$ coupled to the fibers 3095 and 3085 via the lens 3090 and 3080 respectively, are controlled by the single rotating plate 3070. The rotating plate is used for changing the angle of the beam propagating. Rotating the plate where the ends of the fibers mount can perform the circular scan for multiple angle illumination satisfies our purpose.

The rotating plate 3070 is positioned such that the tips of the fibers are on the Fourier plane of the sample plane. Therefore, the positions of the fiber tips determine the angles of the corresponding illuminations.

Figure 3B:
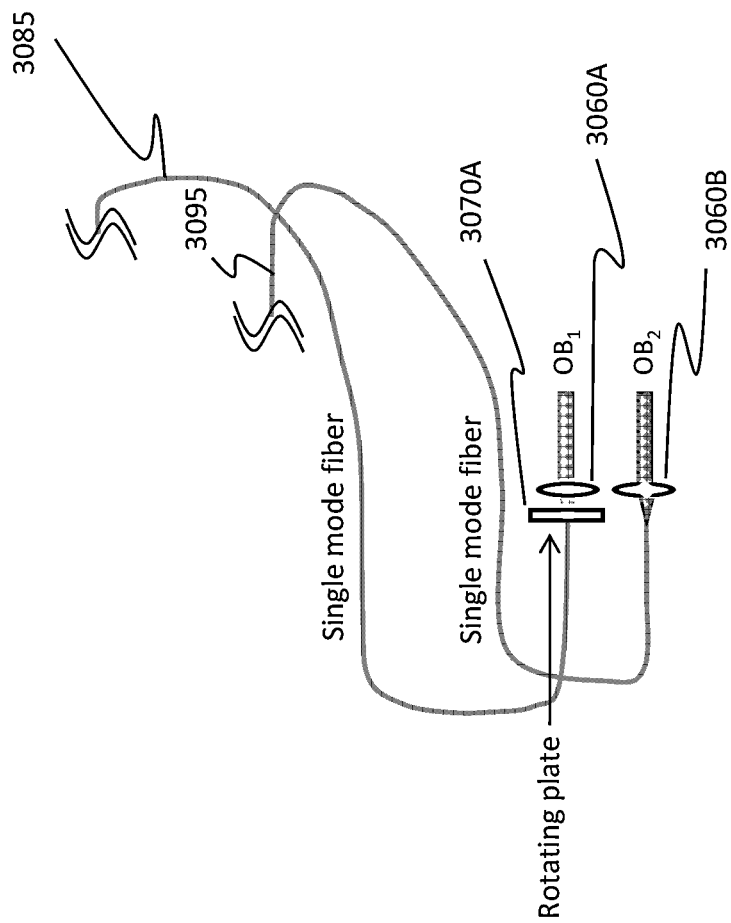
Figure 3C:
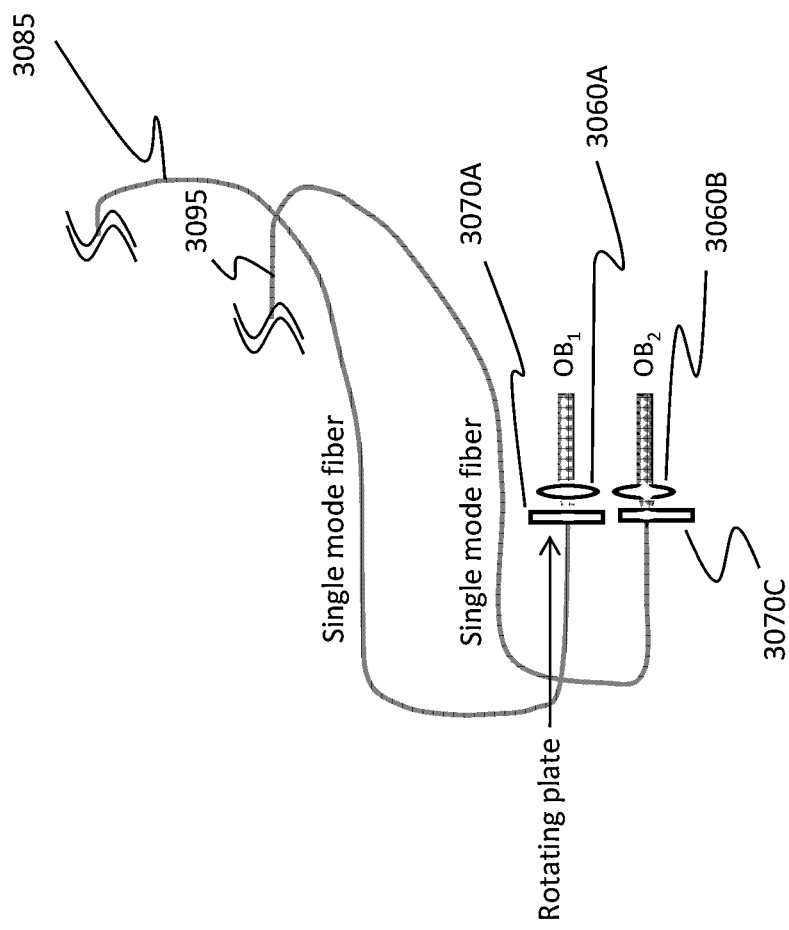

By using the rotating plate, the incident angle of the beam on the sample can be changed. Instead of connecting both fibers 3085 and 3095 to the rotating plate, only one of the optical fiber (3085 or 3095) can be connected to the rotating plate, as illustrated in FIG. 3B which is an enlargement of 3099 in FIG. 3A. As illustrated in FIG. 3C, each optical fiber can be connected to each rotating plate (3070A, 3070C). A reference numbers 3060A 3060B are lenses. Polarizers 3000 and 3050 are used as necessary. Furthermore, there is no need to add rotating plate if we want to use more and more object beams with different incident angles. Instead of using two polarizer 3000 and 3050, one polarizer can be placed between the beam coupler 1018 and the detector (camera 1009).

Embodiment 3

Figure 4A:
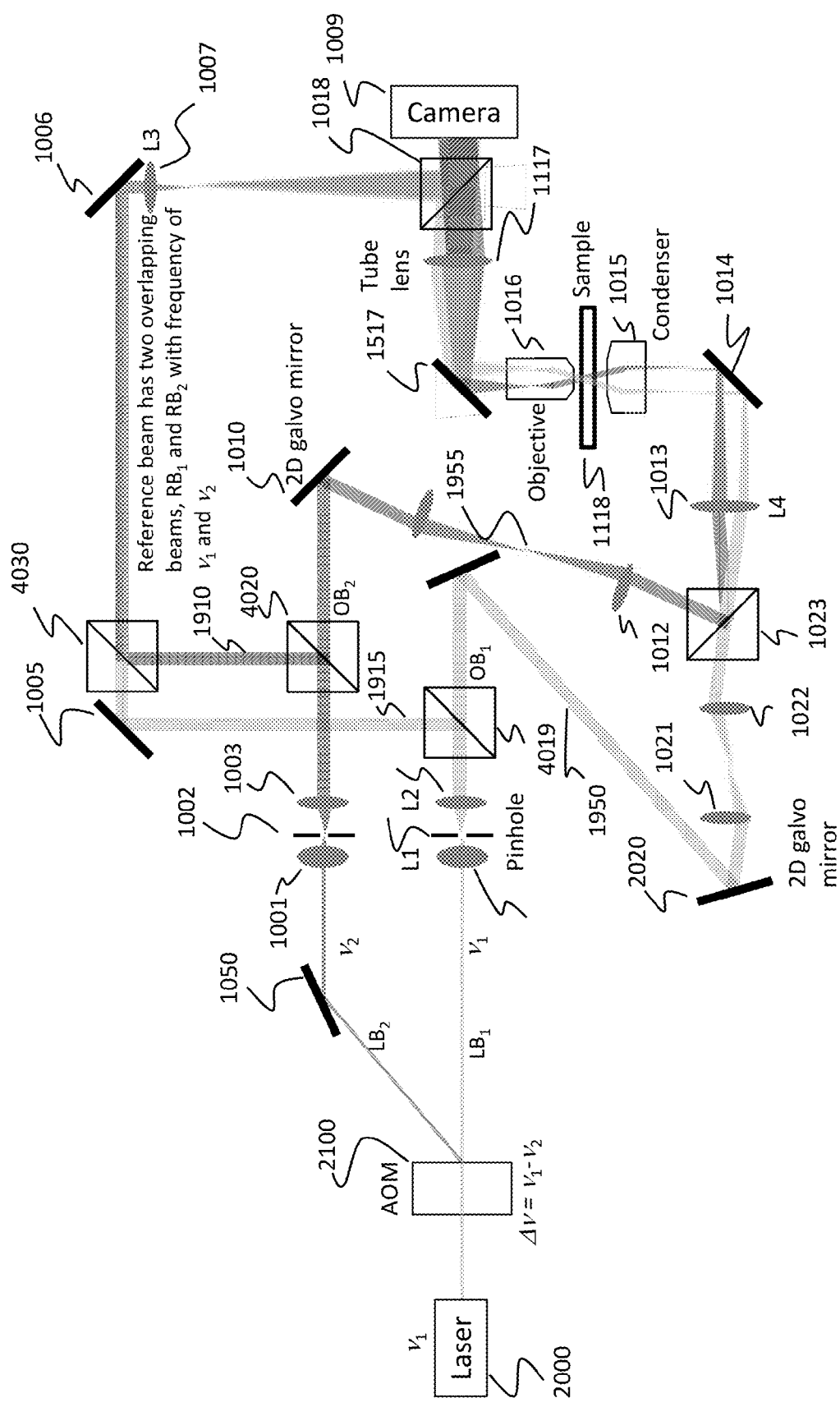
FIG. 4A illustrates an apparatus for generating holograms explained in an embodiment 3.

In the embodiment 3, the reference beams 1910 and 1915 has different paths each other as illustrated in FIG. 4A. The reference beam 1915 is transmitted through the beam splitter 4019 and the mirror 1005, and the reference beam 1910 is transmitted through a beam splitter 4020 and a coupler 4030.

Embodiment 4

Figure 4B:
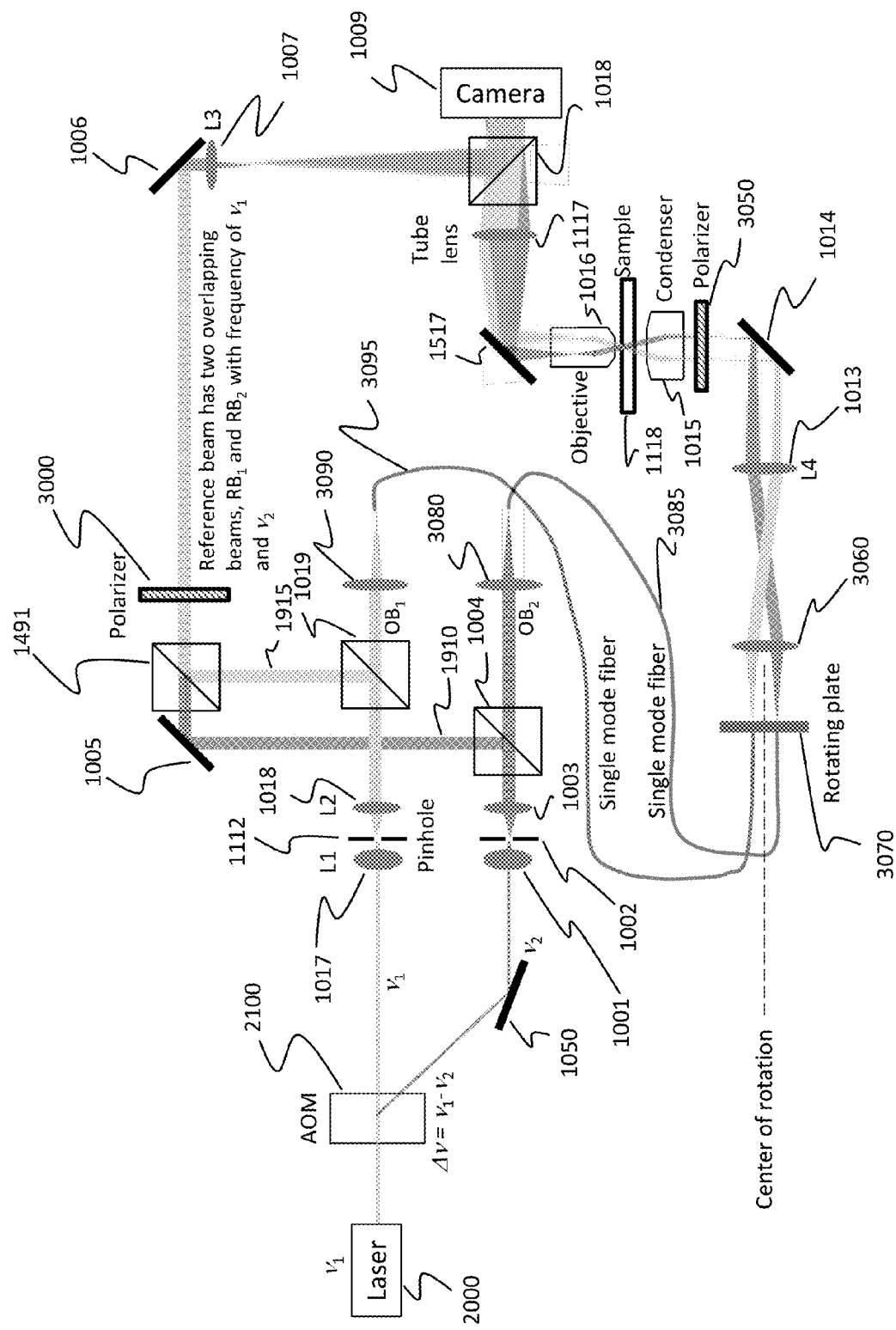
FIG. 4B illustrates an apparatus for generating holograms explained in an embodiment 4.

In the embodiment 4, the reference beams 1910 and 1915 has different paths each other as illustrated in FIG. 4B. The reference beam 1915 is transmitted through the beam splitter 1019 and a coupler 1491, and the reference beam 1910 is transmitted through a beam splitter 1004 and the mirror 1005.

Other Embodiment

According to the above explained apparatuses, composite multiplex holograms which are created with multi-incident angles of the object beam can be obtained, and the holograms can be used for reconstructing a three-dimensional image of the sample. The Reconstructed image of the sample can be calculated, for example, as following steps by using a calculation unit, such as a computer. (i) After an interference fringe pattern is obtained by the camera 1009 with a detector as illustrated in FIG. 18B, a spatial frequency spectrum is obtained by a calculation based on a numerical 2D FFT (Fast Fourier Transform). (ii) The 1st order spectrum will be cropped (selectively collected) by using a computational aperture according to the object beam angle. (iii) Then, finally calculate a reconstructed image by numerical 3D IFFT (Inverse Fast Fourier Transform) spectrum of the object by using the cropped spectrum.

While the embodiments according to the present invention have been described with reference to exemplary embodiments, it is to be understood that the present invention is not limited to the above described embodiments. The scope of the following claims is to be accorded the broadest interpretation so as to encompass all such modifications and equivalent structures and functions.

What is claimed is:

1. An apparatus for detecting an interference fringe pattern comprising:
    a laser source configured to emit a laser beam with a frequency of v,
    an acoustic optical modulator configured to generate, from the laser beam, a first beam with a frequency of $v_1$ and a second beam with a frequency of $v_2$ different from the frequency of $v_1$;
    a first beam splitter configured to split the first beam into a first reference beam and a first object beam, the first object beam being led to a sample with a first incident angle;
    a second beam splitter configured to split the second beam into a second reference beam and a second object beam, the second object beam being led to the sample with a second incident angle different from the first incident angle; and
    a detector configured to detect, at an exposure time, an image composed of a first interference fringe pattern, based on the first reference beam and the first object beam, and a second interference fringe pattern, based on the second reference beam and the second object beam,
    wherein the inverse of $\Delta v$ ($\Delta v=|v_2-v_1|$) is shorter than the exposure time so that the detector does not detect interference fringe patterns due to a first pair of the first and second reference beams, a second pair of the first and second object beams, a third pair of the first reference beam and the second object beam, and a fourth pair of the second reference beam and the first object beam, and
    wherein the exposure time is set at milli-second order and the inverse of $\Delta v$ is set at sub micro-second order.

2. The apparatus for detecting an interference fringe pattern according to claim 1, further comprising a first optical fiber and a second optical fiber, wherein the first object beam is connected to the first optical fiber and the second object beam is connected to the second optical fiber.

3. The apparatus for detecting an interference fringe pattern according to claim 2, wherein at least one of the optical fiber is provided with a rotating plate to change an incident angle to the sample.

4. A holographic microscope comprising:
    a laser source configured to emit a laser beam with a frequency of v,
    an acoustic optical modulator configured to generate, from the laser beam, a first beam with a frequency of $v_1$ and a second beam with a frequency of $v_2$ different from the frequency of $v_1$;
    a first beam splitter configured to split the first beam into a first reference beam and a first object beam, the first object beam being led to a sample with a first incident angle;
    a second beam splitter configured to split the second beam into a second reference beam and a second object beam, the second object beam being led to the sample with a second incident angle different from the first incident angle;
    a detector configured to detect, at an exposure time, an image composed of a first interference fringe pattern, based on the first reference beam and the first object beam, and a second interference fringe pattern, based on the second reference beam and the second object beam; and
    a calculation unit configured to calculate a reconstructed image of the sample by using the image composed of the first and second interference fringe patterns,
    wherein the inverse of $\Delta v$ ($\Delta v=|v_2-v_1|$) is shorter than the exposure time so that the detector does not detect interference fringe patterns due to a first pair of the first and second reference beams, a second pair of the first and second object beams, a third pair of the first reference beam and the second object beam, and a fourth pair of the second reference beam and the first object beam, and
    wherein the exposure time is set at milli-second order and the inverse of $\Delta v$ is set at sub micro-second order.

5. An apparatus for detecting an interference fringe pattern comprising:
    a laser source configured to emit a laser beam with a frequency of v,
    an acoustic optical modulator configured to generate, from the laser beam, a first beam with a frequency of $v_1$ and a second beam with a frequency of $v_2$ different from the frequency of $v_1$;
    a first beam splitter configured to split the first beam into a first reference beam and a first object beam, the first object beam being led to a sample with a first incident angle;
    a second beam splitter configured to split the second beam into a second reference beam and a second object beam, the second object beam being led to the sample with a second incident angle different from the first incident angle; and
    a detector configured to detect, at an exposure time, an interference fringe pattern formed by the first reference beam, the first object beam, the second reference beam and the second object beam,
    wherein the inverse of $\Delta v$ ($\Delta v=|v_2-v_1|$) is shorter than the exposure time so that an interference fringe due to a first pair of the first and second object beams is not detected, and
    wherein the exposure time is set at milli-second order and the inverse of $\Delta v$ is set at sub micro-second order.

6. The apparatus for detecting the interference fringe pattern according to claim 5, wherein the inverse of $\Delta v$ ($\Delta v=|v_2-v_1|$) is shorter than the exposure time so that an interference fringe due to a pair of a second pair of the first reference beam and the second object beam, and a third pair of the second reference beam and the first object beam.

7. The apparatus for detecting an interference fringe pattern according to claim 5, further comprising an optical fiber to lead the first object beams toward the sample.

8. The apparatus for detecting an interference fringe pattern according to claim 7, further comprising a rotating plate, wherein the optical fiber is connected to the rotating plate to change the first incident angle of the first object beam.

9. The apparatus for detecting the interference fringe pattern according to claim 5, further comprising a first polarizer for the first and second reference beams and a second polarizer for the first and second object beams.

* * * * *